(12) United States Patent
Gammel et al.

(10) Patent No.: US 8,781,114 B2
(45) Date of Patent: Jul. 15, 2014

(54) APPARATUS AND METHOD FOR RECOGNIZING A FAILURE OF A CRYPTOGRAPHIC UNIT

(75) Inventors: Berndt Gammel, Markt Schwaben (DE); Michael Goessel, Mahlow (DE); Rainer Goettfert, Taufkirchen (DE)

(73) Assignee: Infineon Technologies AG, Neubiberg (DE)

( * ) Notice: Subject to any disclaimer, the term of this patent is extended or adjusted under 35 U.S.C. 154(b) by 1475 days.

(21) Appl. No.: 11/222,504

(22) Filed: Sep. 7, 2005

(65) Prior Publication Data

US 2006/0050875 A1    Mar. 9, 2006

(30) Foreign Application Priority Data

Sep. 8, 2004   (DE) .......................... 10 2004 043 480

(51) Int. Cl.
*H04L 9/00*   (2006.01)

(52) U.S. Cl.
USPC ................................ 380/43; 714/52; 714/801

(58) Field of Classification Search
None
See application file for complete search history.

(56) References Cited

U.S. PATENT DOCUMENTS

| | | | |
|---|---|---|---|
| 3,771,126 A | | 11/1973 | Apple, Jr. |
| 4,074,066 A | | 2/1978 | Ehrsam et al. |
| 4,410,990 A | * | 10/1983 | Wilkinson ................ 714/798 |
| 4,530,095 A | * | 7/1985 | Ryan ......................... 714/801 |
| 5,365,591 A | | 11/1994 | Carswell et al. |
| 5,432,848 A | | 7/1995 | Butter et al. |
| 2006/0059371 A1 | * | 3/2006 | Haug et al. .................... 713/189 |

FOREIGN PATENT DOCUMENTS

| | | |
|---|---|---|
| DE | 102 61 810 B4 | 7/2004 |
| FR | 2825077 | 8/2002 |
| FR | 2850811 | 8/2004 |
| JP | 1-188134 A | 7/1989 |
| WO | WO-01/56249 A1 | 8/2001 |

OTHER PUBLICATIONS

Wu, K.; Ramesh Karri; Kuznetsov, G.; Goessel, M.; "Low Cost Concurrent Error Detection for the Advance Encryption Standard" Test Conference, 2004. Proceedings. ITC 2004. International, Feb. 2004, pp. 1242-1248.*

J. Daemen and V. Rijmen; "Advanced Encryption Standard, AES Proposal: Rijndael"; The Rijndael Block Cipher, Document version 2, Mar. 9, 1999, pp. 1-45.

(Continued)

*Primary Examiner* — Kaveh Abrishamkar
(74) *Attorney, Agent, or Firm* — Schiff Hardin LLP

(57) ABSTRACT

An apparatus for recognizing a failure in a cryptographic unit, wherein the cryptographic unit includes a determinator for determining an input control signal and an output control signal, with the determinator being formed to determine the input control signal on the basis of an encryption of an input control signal parity of a group of input signals or an input signal of the group of input signals with an encryption number and to determine the output control signal on the basis of an encryption of an output control signal parity of a group of the output signals or an output signal of the group of output signals with the encryption number. Furthermore, the apparatus for recognizing includes an evaluator for evaluating the input control signal and the output control signal to recognize a failure of the cryptographic unit on the basis of a comparison between the input control signal and the output control signal.

31 Claims, 9 Drawing Sheets

(56) References Cited

OTHER PUBLICATIONS

G. Bertoni, et al.; "Error Analysis and Detection Procedures for a Hardware Implementation of the Advanced Encryption Standard"; IEEE Transactions on Computers, vol. 52, No. 4, Apr. 2003, pp. 492-505.

K. Wu, et al.; "Low Cost Concurrent Error Detection for the Advanced Encryption Standard"; Prepring 008/2003, Oct. 2003, ISSN 0946-7580, University of Potsdam, Institute for Informatics.

Yen, et al., "A Countermeasure against One Physical Cryptanalysis May Benefit Another Attack," ICICS 2000, LNCS 2288, pp. 414-427, 2002.

Karpovsky, et al., "Robust Protection Against Fault-Injection Attacks on Smart Cards Implementing the Advanced Encryption Standard," Dependable Systems and Networks (DSN04), 2004.

\* cited by examiner

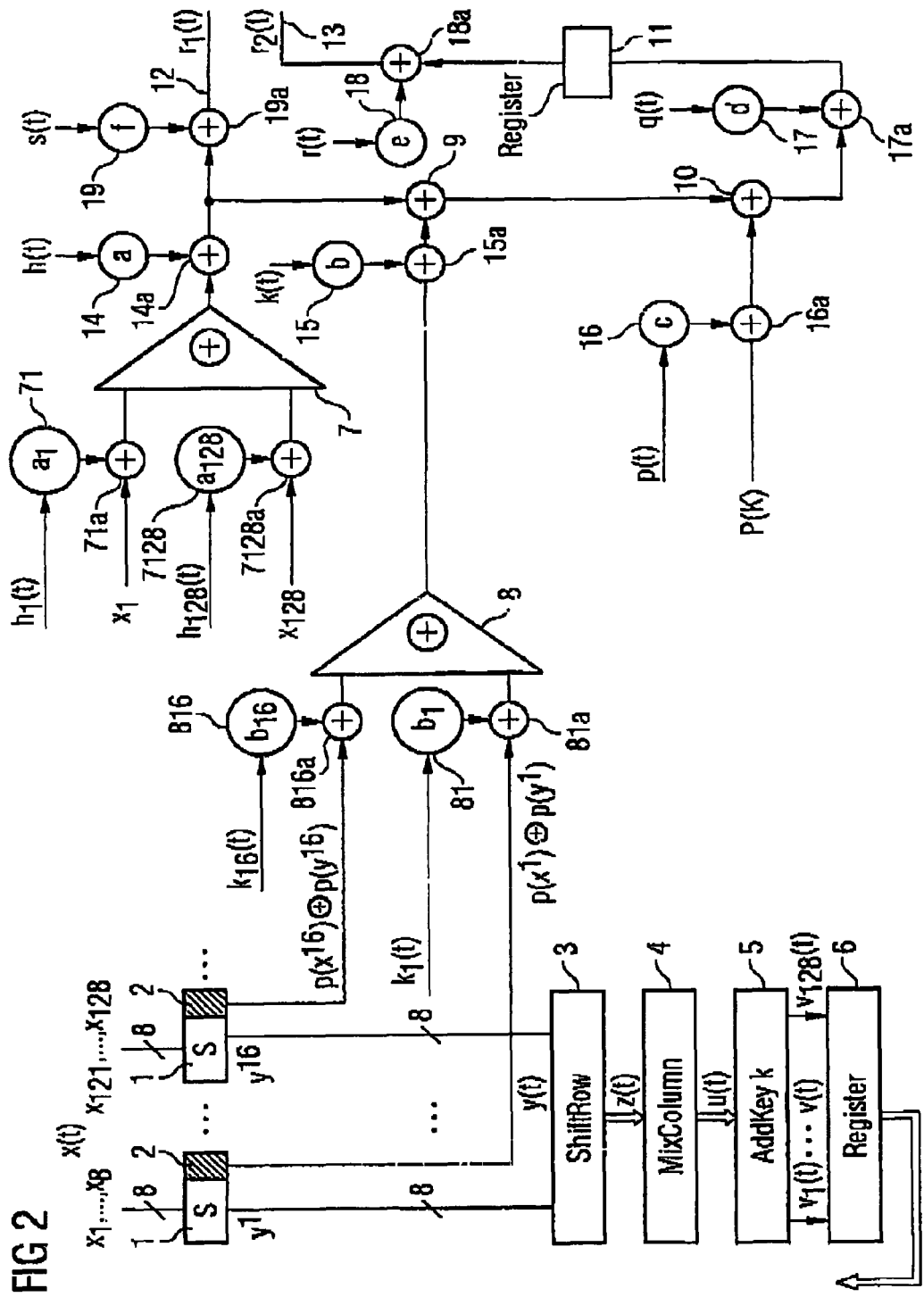

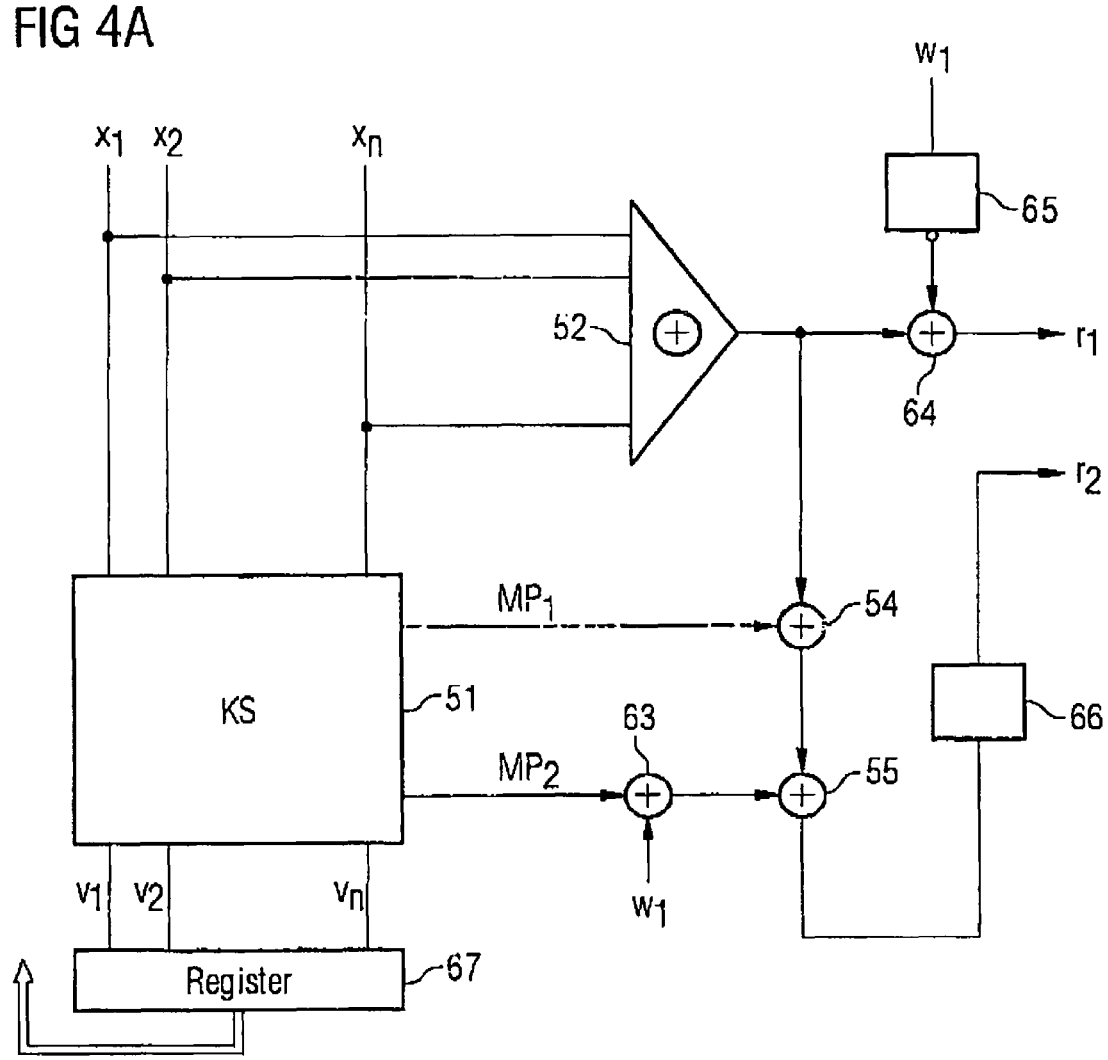

APPARATUS AND METHOD FOR RECOGNIZING A FAILURE OF A CRYPTOGRAPHIC UNIT

CROSS-REFERENCE TO RELATED APPLICATION

This application claims priority from German Patent Application No. 102004043480.8, which was filed on Sep. 8, 2004, and is incorporated herein by reference in its entirety.

BACKGROUND OF THE INVENTION

1. Field of the Invention

The present invention concerns the technical field of cryptography, and the present invention particularly concerns the technical field of the constant monitoring of cryptographic circuits for occurring errors in running operation.

2. Description of the Related Art

Due to the significant expansion of modern-day data transmission, for example via electronic mail (e-mail) via the internet, there is also increasing interest in being able to transfer personal or secret data via mostly insecure message transfer channels (such as an internet connection) in a protected manner. For this, various approaches have been proposed, such as the method outlined in the "Data Encryption Standard" (DES). It is to be noted, however, that with the increase in available computing capacity such a cryptographic method may be "cracked" also by non-authorized persons, employing high numerical expense. Hereby, a need for further increase in the security of cryptographic methods results. Such an enhanced cryptographic method has been proposed, for example, in the proposals for an enhanced cryptographic standard like the "Advanced Encryption Standard" (AES) by J. Daemen and V. Rijmen in the document "AES proposal: Rijndael".

In this AES proposal, in successive rounds, an unencrypted text is transformed into an encrypted text, which is again decrypted in successive rounds after transfer to a receiver. Here, in one round, the operations of a non-linear substitution, Shift-Row, MixColumn, and AddKey are used, as illustrated in detail in the article "AES proposal: Rijndael" by J. Daemen and V. Rijmen.

The use of the AES algorithm proposed, however, does not always guarantee reliable communication or encryption. Previous works have shown that even in individual occurring errors during the encryption with the AES algorithm (or a decryption algorithm corresponding to a decryption with the AES algorithm) a high number of errors in the encrypted or decrypted data are very likely to result.

Prior to the transfer of such erroneous data or the output of such erroneous data, these errors have to be recognized in order to avoid data transfer of erroneous data on the one hand and at the same time also prevent output erroneous data from being used to be able to derive sensitive information from the encryption or decryption algorithm (such as the secret encryption or decryption key) on the other hand.

The error recognition for the above-described AES algorithm may, for example, take place by a parity code, as it is described in G. Bertoni, L. Breveglieri, I. Koren and V. Piuri, "Error Analysis and Detection Procedures for a Hardware Implementation of the Advanced Encryption Standard", IEEE Transactions on Computers, vol. 52, No. 4, pages 492-505, April 2003. A further possibility for the error recognition for the AES algorithm is described in Wu K., Karri R., Kuznetsov, G. and Goessel M., "Low Cost Concurrent Error Detection for the Advanced Encryption Standard", Preprint 008/2003, October 2003, ISSN 0946-7580, University of Potsdam, Institute for Computer Science, as it is also explained in DE 10261810.

Thus, in Wu K., Karri R., Kuznetsov, G. and Goessel M., "Low Cost Concurrent Error Detection for the Advanced Encryption Standard", Preprint 008/2003, October 2003, ISSN 0946-7580, University of Potsdam, Institute for Computer Science, the parity of the input values of a round of the AES algorithm is transformed into the parity of the output values of the same round and compared with the actual, possibly inverted parity of the output values for each round.

If the parity transformed into the output parity and the actual output parity do not match, an error is indicated.

Here, both technically induced errors and intentionally injected errors are recognized if they corrupt an odd number of bits.

By intentionally injected errors, such as by selective irradiating the circuit, by changes in the operating voltage, by heating, and other measures, attackers may seek to change the chip so that they can determine the key used in the encryption/decryption of a round with less complexity than would be possible in a non-faulty chip.

In order to indicate an error, as mentioned above, in the approach previously proposed by Wu K., Karri R., Kuznetsov, G. and Goessel M., the parity transformed into the inverted output parity and the actual output parity are calculated, and if these do not match, an error is indicated. Such a possibility for the recognition of an occurred error is illustrated in FIG. 6 in greater detail, which shows a circuit for the implementation of successive rounds of the AES algorithm with error recognition using a parity code, as corresponds to the approach shown in DE 10261810 and thus is to be regarded as prior art.

FIG. 7A shows a cryptographic circuit KS 51 for encrypting or for decrypting data with error recognition by a parity code, according to the prior art. At its n inputs, the n binary input signals $x_1, \ldots, x_n$ are present. Here, n has been assumed to be equal to 128. From these input signals, an input parity $$P(x) = x_1 \oplus \ldots \oplus x_n$$

is formed in the XOR tree 52. The input signals $x_1, \ldots, x_n$ are processed into the output signals $v_1 \ldots v_n$ in l, l≥1, successive processing steps in the cryptographic circuit KS 51. Corresponding to the l processing steps executed in the cryptographic circuit KS 51, the parity P(x) of the input signals is modified by modifying parity signals $MP_1, \ldots, MP_l$, which are linked with the parity P(x) of the input signals by the XOR gates 54 and 55 to the modified parity $P_M$.

From the outputs $v_1, \ldots, v_n$ of the cryptographic circuit KS 51, the parity P(v) of the outputs, $P(v) = v_1 \oplus \ldots \oplus v_n$, is formed in the XOR tree 53. The modified parity $P_M$ and the parity of the outputs P(v) are compared at the outputs $r_1$ and $r_2$. If the modified parity $P_M$ is equal to the parity of the outputs P(v), no recognizable error is present. A difference of both values indicates an error.

A concrete design of a cryptographic circuit with error recognition for the AES algorithm according to the prior art is illustrated in FIG. 7B.

In FIG. 7B, a circuit, in which n is chosen to be equal to 128, is shown. The cryptographic circuit KS consists of the circuit parts performing the non-linear substitution of the data in the S boxes 1, the operation Shift Rows 3, the operation MixColumns 4, and the operation AddKey 5. In the XOR tree 7, the parity of the respectively present inputs is formed.

Corresponding to the processing step "non-linear substitution", the parity of the inputs is modified by the parity $$MP_1 = p(x^1) \oplus p(y^1) \oplus \ldots \oplus p(x^{16}) \oplus p(y^{16})$$

formed in the XOR tree 8 (referring back to the nomenclature of FIG. 7A). Since the operations "Shift Rows" and "Mix-Columns" for the AES algorithm do not cause modification of the parity, no modifying parity signal is required for these operations.

The modification of the parity by the operation "AddKey" takes place by the modulo 2 addition of the parity P(K) of the key $K=k_1, \ldots, k_{128}$ with $P(K)=k_1 \oplus \ldots \oplus k_{128}$ in the XOR gate 10. It can be recognized that in the concrete case from FIG. 7B as opposed to the case in FIG. 7A $1=2$ and $MP_2=P(K)$ applies.

The processing of the data takes place in the AES algorithm in successive rounds, in which the output signals of the i-th round are the input signals of the (i+1)-th round.

Thereby, it is possible that in the concrete case of the AES the function of the parity tree 53 in FIG. 7A may be taken over from the parity tree 7 in FIG. 7B. For this, the output signals of the cryptographic circuit in FIG. 7B obtained in a round i, which are here the outputs of the operation "AddKey" 5, are latched in a register 6 and again input in the cryptographic circuit as input signals in the next (i+1)-th round. It can be realized that then the parity of the outputs of the i-th round, which is equal to the parity of the input signals of the (i+1)-th round, is calculated in the parity tree 7.

If the modified parity $P_M$ is delayed in the register 11 of FIG. 7B, at the outputs $r_2$ and $r_1$ the modified parity of the inputs of the i-th round and the parity of the outputs of the i-th round are compared.

An additional parity tree, such as the parity tree 53 in FIG. 7A, could of course also be used at the outputs of the operation "AddKey". But since, as has already been set forth, the data processing in the AES takes place in successive rounds, the parity calculation of the parity of the output signals may functionally also be made in the parity tree for the calculation of the parity of the inputs.

In the circuit of FIG. 7B, n is also chosen to be equal to 128. The cryptographic circuit KS consists of the circuit parts performing the non-linear substitution of the data in the S boxes, the operation Shift Rows 3, the operation MixColumns 4, and the operation AddKey 5. In the XOR tree 7, the parity of the respectively present inputs is formed.

The input x assumed as 128 bits wide in FIG. 7B is divided into 16 bit groups $x^1=x_1, \ldots, x_8, \ldots, x^{16}=x_{121}, \ldots, x_{128}$ each 8 bits wide, which are each processed by one of the 16 non-linear functions S into the bit group $y^1=y_1, \ldots, y_8, \ldots, y^{16}=y_{121}, \ldots, y_{128}$. The function S is also referred to as S box 1 and may, for example, be realized by a ROM.

As shown in Wu K., Karri R., Kuznetsov, G. and Goessel, M., the i-th S box has an additional $9^{th}$ output in $i=1, \ldots 16$, which realizes the function $p(x^i) \oplus p(y^i)$, wherein $p(x^1)$ and $p(y^i)$ designate the parity of the input signals $x^i$ of the i-th S box and the parity of the output signals $y^i$ of the i-th S box, respectively, so that, for example, $$p(x^1) \oplus p(y^1) = x_1 \oplus x_2 \oplus \ldots \oplus x_8 \oplus y_1 \oplus y_2 \oplus \ldots y_8$$

applies, with the operator $\oplus$ designating XORing.

The inputs of the circuit $x^1, \ldots, x^{16}=x_1, \ldots, x_8, \ldots, x_{121}, \ldots, x_{128}$ are linked to the parity P(x) in a parity tree 7, directly present at the output 12 for error recognition.

In the XOR tree 8, the parities $p(x^i) \oplus p(y^i), \ldots, p(x^{16}) \oplus p(y^{16})$ are XORed. The output of the XOR tree 8 is linked with the parity P(x) to p(y) in the XOR gate 9.

The outputs $y(t)=y^i, \ldots, y^{16}$ of the S boxes 1 are processed into the binary values z(t) (which may change in the course of time and thus depend on the time parameter t) by the row shift operation Shift-Rows 3, with the parity not changing. Furthermore, the values z(t) are transformed into the values u(t) by the column mix operation MixColumn 4, wherein the values u(t) are also time-variable, and wherein their parity also does not change. In the subsequent operation of adding a key AddKey 5, the values of a binary key K are modulo 2 added to the values u(t) component-wise so that the values of v(t) result, which are also variable in the course of time. Subsequently, the values v(t) are latched in a register 6 and again fed to the AES algorithm illustrated in FIG. 7B as input values x in an ensuing next round, whereby the AES algorithm obtains a recursive structure.

The output of the XOR gate 9 carrying the signal P(y) is linked with the parity P(K) of the key K to $P_M(v(t))$ in the XOR gate 10. The input parity P(x(t)) has been modified into the parity $P_M(v(t))$ here, so that in the error-free case the modified parity $P_M(v(t))$ is equal to the parity P(v(t)) of the binary output values $v(t)=v_1(t), \ldots, v_{128}(t)$.

The output values v(t) of the operation AddKey 5 are stored in the register 6 and connected to the inputs of the circuit in the next clock via a multiplexer, which is not drawn, so that now in the next clock t+1 in the XOR tree 7 the parity signal P(v(t)) is output directly to the output $r_1$. The binary signal $P_M(v(t))$ output by the XOR gate 10 is stored in the register 11 for one clock and output directly to the output $r_2$ 13, so that at the outputs $r_1$ 12 and $r_2$ 13 the signals P(v(t)) and $P_M(v(t))$ are compared with each other in the clock t+1. A difference of both signals indicates an error.

By the error signal indicating an error in the parity of the non-monitored data, however, a potential attacker may for example obtain additional information on the number of ones and zeros present in the data words, which is disadvantageous.

In U.S. Pat. No. 5,365,591, it is described how an error recognition in a cryptographic system may be implemented using pseudo-random signals for a multiprocessor system preferably implementing the DES algorithm, so that the output values of the comparators used there alternate. It is disadvantageous that such an implementation is very intensive and that the method described cannot or not easily be employed for complex algorithms, such as the AES algorithm.

SUMMARY OF THE INVENTION

Starting from this prior art, it is an object of the present invention to provide a possibility to be able to recognize a failure in a cryptographic unit, but at the same time be able to prevent a conclusion on the data used in the cryptographic unit. Furthermore, this possibility should be easy to realize with conventional approaches in terms of circuit engineering or numerically, in order to be able to provide securing of the data processed in the cryptographic unit as inexpensively as possible.

In accordance with a first aspect, the present invention provides an apparatus for recognizing a failure in a cryptographic unit, with the cryptographic unit being formed to determine output signals from input signals, and with the apparatus for recognizing having: a determinator for determining at least one input control signal and at least one output control signal, with the determinator being formed to determine the input control signal on the basis of an encryption of an input signal control parity of a group of the input signals or an input signal of the group of input signals with an encryption number and to determine the output control signal on the basis of an encryption of an output signal control parity of a group of the output signals or an output signal of the group of output signals with the encryption number; and an evaluator for evaluating the input control signal and the output control signal to recognize a failure of the cryptographic unit on the basis of a comparison between the input control signal and the output control signal.

In accordance with a second aspect, the present invention provides a method of recognizing a failure in a cryptographic unit, with the cryptographic unit being formed to determine output signals from input signals, and with the method for recognizing having the steps of: determining an input control signal and an output control signal to determine the input control signal on the basis of an encryption of an input signal control parity of a group of the input signals or an input signal of the group of input signals with an encryption number and to determine the output control signal on the basis of an encryption of an output signal control parity of a group of the output signals or an output signal of the group of output signals with the encryption number; and evaluating the input control signal and the output control signal to recognize a failure of the cryptographic unit on the basis of a comparison between the input control signal and the output control signal.

In accordance with a third aspect, the present invention provides a computer program with program code for performing, when the computer program is executed on a computer, the method of recognizing a failure in a cryptographic unit, with the cryptographic unit being formed to determine output signals from input signals, and with the method for recognizing having the steps of: determining an input control signal and an output control signal to determine the input control signal on the basis of an encryption of an input signal control parity of a group of the input signals or an input signal of the group of input signals with an encryption number and to determine the output control signal on the basis of an encryption of an output signal control parity of a group of the output signals or an output signal of the group of output signals with the encryption number; and evaluating the input control signal and the output control signal to recognize a failure of the cryptographic unit on the basis of a comparison between the input control signal and the output control signal.

The present invention is based on the finding that the cryptographic unit can generate output data from input data, and wherein the input data are used for determining the input control signal, while at the same time the output data are used for determining the output control signal. Here, from the input signal, an input control signal is determined, in which the input signals are taken into account using an encryption with at least one encryption number. At the same time, from the output signals, an output control signal is determined, wherein again an encryption of the output data with the same encryption numbers as the encryption of the input signals is taken into account in the determination of the output control signal. From a comparison of the input control signal and the output control signal, which were both determined using the at least one encryption number, a failure of the cryptographic unit may be recognized by comparison of the encrypted input control signal with the encrypted output control signal. For this, the encryption number need not be known; rather, by the encrypting (or the use of an encryption operation with the at least one encryption number, to obtain the input control signal and the output control signal), it may be prevented that a conclusion on the data used or processed in the cryptographic unit (such as a cryptographic key) may be drawn from the input control signal or the output control signal.

The present invention hence offers the advantage of preventing, in a simple and thus inexpensive manner, a conclusion on sensitive data in the cryptographic unit from also being drawn from error recognition signals, such as the input control signal and/or the output control signal, providing information on an occurred error in the cryptographic unit. At the same time, such an increase in security is possible by a measure easy to realize in terms of circuit engineering, because, first, the encryption number can easily be provided for example in the form of a shift register-based PN sequence generation, and, second, a link of data with the encryption number can be executed for example by an also very easy-to-realize possibility using EXCLUSIVE OR (XOR) or EXCLUSIVE NOR (XNOR) gates. Hereby, as an additional aspect to the increase in security of an encryption or decryption method, a very simple realization possibility results as compared with a conventional AES algorithm, which distinguishes itself by only a small increase in costs for acquiring the additional security measure as opposed to conventional AES algorithms.

In a preferred embodiment of the apparatus for recognizing a failure in a cryptographic unit, means for determining is formed to determine the encryption on the basis of an EXCLUSIVE OR (XOR) or on the basis of an EXCLUSIVE NOR (XNOR) operation.

Furthermore, it is favorable if means for determining is formed to use a random number or a pseudo-random number as an encryption number.

In particular, it is favorable if means for determining is formed to obtain the input control signal on the basis of a first encryption structure and to obtain the output control signal on the basis of a second encryption structure, with a design of the second encryption structure being dependent on a design of the first encryption structure and with the first and second encryption structures being formed to adjust a predefined relation between the input control signal and the output control signal.

In particular, means for determining may be formed to delay encrypting with the encryption number.

Furthermore, means for providing may be formed in an especially favorable manner if encrypting is performed on the basis of a negated encryption number.

Moreover, the cryptographic unit may be formed to use a cryptographic key for determining the output signals from the input signals, and wherein means for determining may be formed to encrypt the cryptographic key with the encryption number.

Favorably, also the cryptographic unit is formed to obtain intermediate signals from the input signals corresponding to its respective processing steps, with means for determining being formed to perform, in determining the input control signal, an encryption of an intermediate signal control parity of a group of the intermediate signals or an intermediate signal of the group of intermediate signals with the encryption number.

Furthermore, the intermediate signals may be formed as modifying parities modifying the parity of the inputs in a simple manner, such as by XORings, into a modified parity equal to the parity of the outputs in the error-free case.

Furthermore, means for determining may be formed to perform determining the input control signal on the basis of an encryption with a further encryption number and to perform determining the output control signal on the basis of an encryption with the further encryption number.

Furthermore, it is also favorable to form means for determining such that a further input control signal and a further output control signal are determined, with means for determining being further formed to encrypt, for determining the further input control signal, a further input signal control parity of a further group of the input signals or an input signal of the further group of input signals with a security number and to encrypt, for determining the further output control signal, a further output control parity of a further group of the output signals or an output signal of the further group of output signals with the security number, with the further group of input signals being different from the group of input signals and the further group of output signals being different from the group of output signals, and with means for evaluating being formed to recognize a failure of the cryptographic unit on the basis of a comparison of the further input control signal with the further output control signal.

In a further favorable embodiment, means for determining may be formed to use a random number or a pseudo-random number as the security number.

Moreover, means for determining may be formed to use the random number as the security number.

Means for evaluating may further be formed to perform recognizing a failure of the cryptographic unit alternatingly on the basis of a comparison between the input control signal and the output control signal or on the basis of a comparison between the further input control signal and the further output control signal.

It is favorable if means for evaluating is formed to recognize a failure of the cryptographic unit if the comparison between the input control signal and the output control signal and also the comparison between the further input control signal and the further output control signal provide a negative result.

Moreover, means for determining may be formed to perform determining the further input control signal on the basis of an encryption with a further security number and to perform determining the further output control signal on the basis of an encryption with the further security number.

Furthermore, it is of advantage to form means for determining such as to cause the input control signal and the output control signal to differ at a first time instant at a failure-free operation of the cryptographic unit and not to differ at a second time instant, and with means for evaluation being further formed to recognize a failure of the cryptographic unit if the input control signal and the output control signal do not differ at the first time instant and differ at the second time instant.

BRIEF DESCRIPTION OF THE DRAWINGS

These and other objects and features of the present invention will become clear from the following description taken in conjunction with the accompanying drawings, in which:

FIG. 2 is a block circuit diagram of a general embodiment of the apparatus for recognizing a failure in a cryptographic unit according to the block structure illustrated in FIG. 1B;

FIG. 4A is a block circuit diagram of a further instantiated embodiment of the apparatus for recognizing a failure in a cryptographic unit;

DESCRIPTION OF THE PREFERRED EMBODIMENTS

Figure 1A:
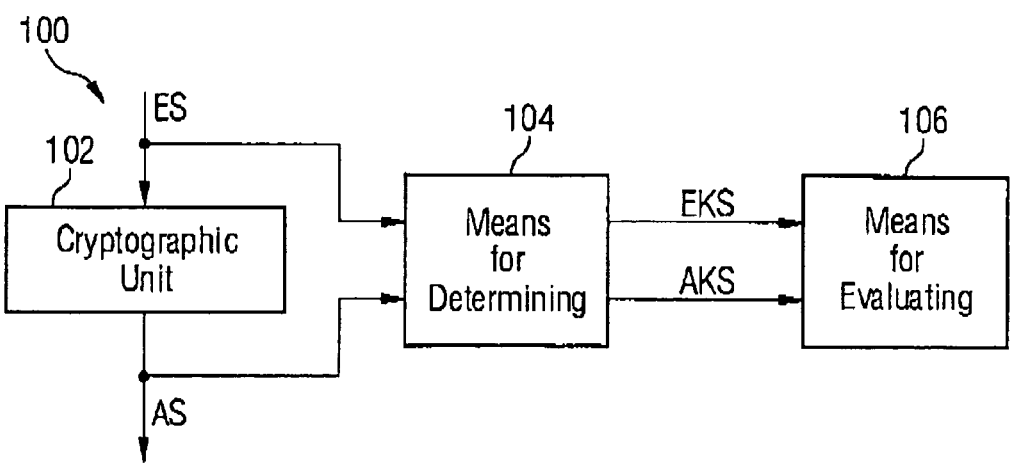
FIG. 1A is a general block circuit diagram of a first embodiment of the apparatus for recognizing a failure in a cryptographic unit.

In the subsequent description of the preferred embodiments of the present invention, the same or similar reference numerals are used for similarly acting elements illustrated in the various drawings, wherein repeated description of these elements is omitted.

FIG. 1A shows a block circuit diagram of an embodiment of the inventive apparatus 100 for recognizing a failure in a cryptographic unit 102. For this, the cryptographic unit 102 comprises an input for receiving input signals ES and further comprises an output for outputting output signals AS determined from the input signals. Furthermore, the apparatus 100 for recognizing comprises means 104 for determining an input control signal EKS and an output control signal AKS, as well as means 106 for evaluating the input control signal EKS and the output control signal AKS. Means 104 for determining includes a first input for receiving the input signals ES and a second input for receiving the output signals AS. Furthermore, means 104 for determining includes a first output for outputting an input control signal EKS to means 106 for evaluating. Additionally, means 104 for determining includes a second output for outputting the output control signal AKS to means 106 for evaluating. Means 106 for evaluating comprises a first input for receiving an input control signal EKS from means 104 for determining and further comprises a second input, via which means 106 for evaluating may receive the output control signal AKS output from means 104 for determining.

In the following, the functioning of the apparatus 100 for recognizing a failure in the cryptographic unit 102 illustrated in FIG. 1A is to be outlined briefly. At first, input signals ES are fed to the cryptographic unit 102, with the cryptographic unit 102 determining the output signals AS from the input signals ES (for example using the AES algorithm). Furthermore, at the same time the input signals ES and the output signals AS determined from the input signals ES in the cryptographic unit 102 are fed to means 104 for determining via its first and second inputs. In order to enable recognizing a failure in the cryptographic unit 102, an input control signal EKS and an output control signal AKS are now determined in means 104 for determining, wherein for determining the input control signal EKS and the output control signal AKS a parity of the input signals or at least a partial group of the input signals may be determined, whereupon the encryption of the determined parity of the input signals or the group of input signals with an encryption number, for example a random number or a pseudo-random number, takes place. Furthermore, also direct encryption of one or more of the input signals may take place, whereupon then a parity of the encrypted input signals or a parity formation of one or more encrypted input signals and one or more unencrypted input signals may take place, so that the input control signal EKS is determined on the basis of at least one parity formation and one encryption operation. With reference to the determination of the output control signal AKS, what has been said for the input control signal EKS applies in an analogous manner. This means that also for the output control signal either all or at least a partial group of the output data are recruited, and subsequently the formed parity is encrypted with an encryption number to obtain the output control signal AKS on the basis of a parity formation and an encryption with the encryption number. Alternatively or additionally, also one or more output signals may be encrypted with the encryption number, whereupon parity formation of the encrypted output signal (or the encrypted output signals) with further encrypted output signals or with unencrypted output signals takes place, so that again the output control signal AKS is determined on the basis of a parity formation and an encryption. By such a determination of the input control signal EKS and the output control signal AKS, it is now possible to make a statement on the functioning or an occurring failure of the cryptographic unit 102 and at the same time be able to prevent a hint to the data processed in the cryptographic unit to be taken from the input control signal EKS or the output control signal AKS. Such "disguising" of the data processed in the cryptographic unit 102 then particularly results from the encryption operation with the encryption number in means 104 for determining. For this, the encryption number used for the encryption operation should preferably not be known externally and/or at least not be able to be tapped.

In means 106 for evaluating, then the input control signal EKS may be compared to the output control signal AKS, and a failure of the cryptographic unit 102 may be recognized on the basis of this comparison. In particular, means 106 for evaluating may be formed such as to recognize a failure of the cryptographic unit 102 if the input control signal EKS is different from the output control signal AKS or alternatively if the input control signal EKS is not different from the output control signal AKS. However, it is also possible that in means 104 for determining the input control signal EKS and the output control signal AKS the input signals ES and the output signals AS are processed such that in error-free function of the cryptographic unit 102 the input control signals and the output control signals behave differently at various time instants.

For example, means 104 for determining may be formed such that in a failure-free function of the cryptographic unit 102 the input control signal EKS differs from the output control signal AKS at a first time instant and in a failure-free function of the cryptographic unit 102 the input control signal EKS does not differ from the output control signal AKS at a further time instant. With such a design of means 104 for determining, it should, however, then be known in means 106 for evaluating, which relation between the input control signal and the output control signal designates absence of failure of the cryptographic unit 102 at which time instants.

Figure 1B:
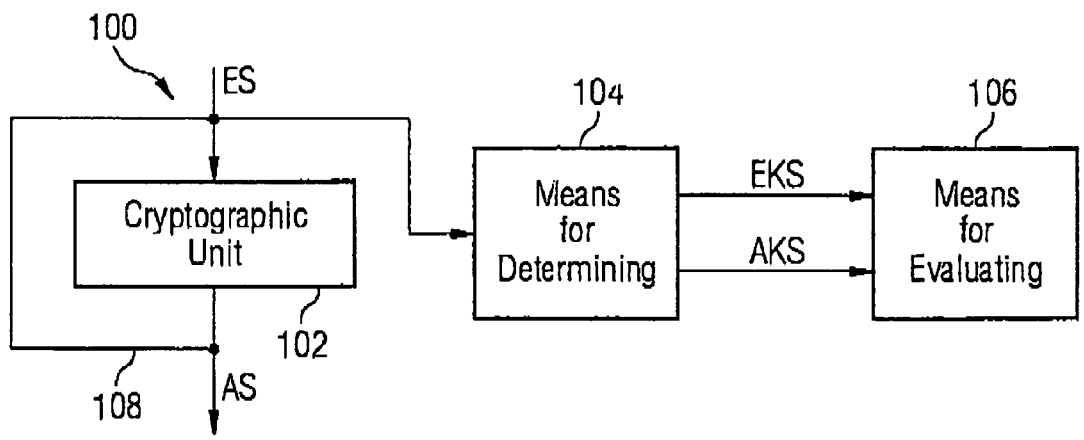
FIG. 1B is a general block circuit diagram of a further embodiment of an apparatus for recognizing a failure in a cryptographic unit.

FIG. 1B shows a block circuit diagram of a further embodiment of the inventive apparatus 100 for recognizing a failure in the cryptographic unit 102. As opposed to the apparatus 100 for recognizing a failure in a cryptographic unit 102 illustrated in FIG. 1A, means 104 for determining only has one input, via which on the one hand the input signals ES of means 104 for determining may be fed to means 104 for determining and on the other hand the output signals AS output via the feedback loop 108 from the cryptographic unit 102 may be fed to means 104 for determining. The structure illustrated in FIG. 1B in particular corresponds to a realization of the AES algorithm in the cryptographic unit 102, which is a recursive algorithm. This means that the output signals AS output from the cryptographic unit 102 (i.e. the AES algorithm) are fed to the cryptographic unit 102 (i.e. for example the AES algorithm) for a subsequent computation step again as input signal. In one design of the inventive apparatus 100 for recognizing, as it is illustrated in FIG. 1B, however, a discrimination of the input signals ES and the output signals AS in means 104 is required. This may, for example, take place in taking reception time instants of the signals received at the input of means 104 for determining into account, such that received signals are at first regarded as input signals, then latched, and the subsequently received signals regarded as output signals for a first round of the algorithm, which were determined by the processing of the input signals ES in the cryptographic unit 102. For a next recursion loop, then the data regarded as output signals may again be used as input signals (i.e. for the second loop), and the signals received hereupon may be regarded as output signals AS (of the second recursion loop of the algorithm performed in the cryptographic unit 102). By such a sequence, it becomes apparent that always two successively received signals (or signal blocks when using a signal bus of several parallel signals as input or output signals) can be compared with each other, and thus, for each recursion loop, the correct function of the cryptographic unit 102 or of the algorithm running in the cryptographic unit 102 may be checked. It is thus not absolutely necessary for the operability of the inventive apparatus 100 that means 104 for determining needs to have different inputs for respectively receiving the input signal (or the input signals) ES and the output signal (or the output signals) AS. Rather, it is sufficient, when using a recursive algorithm in the cryptographic unit 102, to provide only one input for means 104 for determining and to assess the signals received via this input by their temporal offset as input or output signals. Furthermore, additional intermediate signals (not illustrated in FIG. 1B) from the cryptographic unit 102 may be processed by means 104 for determining, wherein the cryptographic unit 102 then has to have an output for outputting these intermediate signals and means 104 for determining an input for receiving these intermediate signals.

FIG. 2 shows a block circuit diagram of a general embodiment of the inventive apparatus for recognizing a failure in a cryptographic unit, as it is already illustrated in FIG. 1B in an overview. For better understanding, in FIG. 2 the same parts as in FIG. 7B have been characterized with the same reference numerals, wherein repeated description of these parts is omitted.

The input x here also assumed to be 128 bits wide is divided into 16 bit groups $x^1 = x_1, \ldots, x_8, \ldots, x^{16} = x_{121}, \ldots, x_{128}$ each 8 bits wide, which are each processed by one of the 16 non-linear functions S into the bit group $y^1 = y_1, \ldots y_8, \ldots y^{16} = y_{121}, \ldots, y_{128}$.

The j-th S box, $j=1, \ldots, 16$, has an additional ninth output realizing the function $p(x^i) \oplus p(y^i)$ in the circuit part 2, with this circuit part 2 realized 16 times in FIG. 1 being part of means 104 for determining and this additional function determining the signal present at the ninth output being recognized in FIG. 1 in auxiliary data to be generated in means 104. Furthermore, as in FIG. 7B, the parity of the inputs and the outputs of this S box is designated with $p(x^1) = x_1 \oplus \ldots \oplus x_8, \ldots, p(x^{16}) = x_{121} \oplus \ldots \oplus x_{128}, p(y^1) = y_1 \oplus \ldots \oplus y_8, \ldots, p(y^{16}) = y_{121} \oplus \ldots \oplus y_{128}$. The input $x_i$, $i=1, \ldots, 128$, is linked to an output of a constant multiplier $a_i$ $7i$, at the input of which the value of the pseudo-random variable $h_i(t)$ is present, at the time instant t via the XOR gate $7ia$. If the value $a_i=1$, the value $h_i(t)$ is directly present at the second input of the XOR gate $7ia$, at the first input of which the value $x_i(t)$ is present. If $a_i=0$, the value 0 is always present at the second input of the XOR gate $7ia$, so that the XOR $7ia$ does not execute a logical function and may be omitted and the input carrying the signal $x_i$ may be directly connected to the i-th input of the XOR tree 7.

It is apparent that the XOR tree 7 outputs the value $$P(x(t)) \oplus a_1 h_1(t) \oplus \ldots \oplus a_{128} h_{128}(t)$$

at its output at the time instant t into the first input of the XOR gate 14, the second input of which is connected to the output of the constant multiplier a14, at the input of which the pseudo-random signal h(t) is present.

Here, $P(x(t)) = x_1(t) \oplus \ldots \oplus x_{128}(t)$ applies.

If a=1, the value of the pseudo-random signal h(t) is directly present at the second input of the XOR gate 14a.

If a=0, the value 0 is present at the second input of the XOR gate 14a, so that it may simply be omitted.

The respective ninth output of the S box 1 carrying the signal $p(x^j) \oplus p(y^j)$, j=1, ..., 16 is connected to the first input of the XOR gate 8ja, at the second input of which the output of the constant multiplier $b_j$ 8$_j$ is present, at the input of which the pseudo-random signal $k_j(t)$ is input at the time instant t. If $b_j=1$, the pseudo-random signal $k_j(t)$ is directly present at the second input of the XOR gate 8ja. If $b_j=0$, the value 0 is always present at the second input of the XOR gate 8ja, so that the XOR gate 8ja does not execute a logical function and may simply be omitted.

The output of the XOR gate 8ja is connected to the j-th input of the XOR tree 8.

It is further apparent that the XOR tree 8 carries the signal $$p(x^1)(t) \oplus p(y^1)(t) \oplus \ldots \oplus p(y^{16}(t)) \oplus p(y^*16^{(t)}) \oplus b_1 k_1(t) \oplus \ldots \oplus b_{16} k_{16}(t)$$

at its output at the time instant t.

The output of the XOR tree 8 is connected to the first input of the XOR gate 15a, to the second input of which the output of the constant multiplier b15 is connected, at the input of which the pseudo-random signal k(t) is present. If b=1, the value of the pseudo-random signal k(t) is directly present at the second input of the XOR gate 15a. If b=0, the constant value 0 is present at the second input of the XOR gate, so that the gate 15a in this case does not execute a logical function and may simply be omitted.

The output of the XOR gate 15a is connected to the first input of the XOR gate 9, the second input of which is connected to the output of the XOR gate 15a, which is at the same time connected to the first input of the XOR gate 19a.

The output of the XOR gate 9 is connected to the first input of the XOR gate 10, the output of which is connected to the first input of the XOR gate 17a.

At the first input of the XOR gate 10, the output of the XOR gate 16a is present. The parity $P(K) = K_1 \oplus \ldots \oplus K_{128}$ of the key K, which is added component-wise to the values u(t) in the operation AddKey 6 modulo 2, is input into the first input of the XOR gate 16a.

At the second input of the XOR gate 16a, the output of the constant multiplier c 16 is attached, at the input of which the pseudo-random signal p(t) is present.

If c=1, the signal p(t) is directly present at the second input of the XOR gate 16a. If c=0, the value 0 is constantly present at this second input, and the gate 16a does not carry out a logical function and may simply be omitted.

The second input of the XOR gate 17a is connected to the output of the constant multiplier d 17, at the input of which the pseudo-random signal g(t) is present. If d=1, the value of the pseudo-random signal g(t) is directly present at the second input of the XOR gate 17a. If d=0, the gate 17a does not carry out a logical function, and it may be omitted.

The output of the XOR gate 17a is connected to the 1 bit wide register 11, the output of which is connected to the first input of the XOR gate 18a, at the second input of which the output of the constant multiplier e 18 is attached, at the input of which the pseudo-random signal r(t) is present.

If e=1, the pseudo-random signal r(t) is directly present at the second input of the gate 18a.

If e=0, the value 0 is constantly present at the second input of this gate, and it does not carry out a logical function and may be omitted.

The output of the XOR gate 18a is directly connected to the output $r_2(t)$ of the circuit.

The second input of the XOR gate 19a is connected to the output of the constant multiplier f 19, at the input of which the pseudo-random signal s(t) is present.

If f=1, the pseudo-random signal s(t) is directly present at the second input of the XOR gate 19a. If f=0, the value 0 is constantly present at the second input of the XOR gate 19a, so that the gate does not logically execute a function and may simply be omitted.

The output of the XOR gate 19a is directly connected to the circuit output $r_1(t)$.

The encryption here takes place for i=1, ... n through the random or pseudo-random signals $h_i$, $k_i$ and h, k, p, a, r, and s.

If the condition $$a_1 h_1(t) \oplus a_2 h_2(t) \oplus \ldots \oplus a_{128} h_{128}(t) \oplus a(t) h(t) \oplus fs(t)$$

$$\oplus a_1 h_1(t-1) \oplus a_2 h_2(t-1) \oplus \ldots \oplus a_{128} h_{128}(t-1) + ah(t-1)$$

$$b_1 k_1(t-1) \oplus \ldots \oplus b_{16} k_{16}(t-1) + bk(t-1)$$

$$\oplus cp(t-1) \oplus dq(t-1) \oplus er(t) \oplus L = 0 \quad (1)$$

is met (which is designated as equation (1) in the following), wherein L may take on the value 0 or 1, an error in the cryptographic unit in the case of L=0 is recognized if $r_1(t)$ and $r_2(t)$ are unequal, and an error in the cryptographic circuit is recognized for a variable L=1, if $r_1(t)$ and $r_2(t)$ are equal.

The cryptographic unit 102 here includes 16 S boxes 1, the circuits for the realization of the operations Shift Row 3, Mix Column 4, Add Key 5.

The outputs v(t) of the cryptographic unit 102 are latched in the register 106 and input into the inputs of the cryptographic circuit and into the means 104 for determining in the next processing round.

Means for determining here specifically consists of the circuit parts 2, by which the 16 S boxes 1 are each supplemented, and of all other circuit parts illustrated in FIG. 2, which do not form the cryptographic unit 102.

The means 106 for evaluating, which is not illustrated in FIG. 2, evaluates the match or mismatch of the signals $r_1(t)$ and $r_2(t)$ by an XOR gate, for example, as this is well known to one skilled in the art.

It can be seen that means 104 for determining only comprises one input. The input signals, each offset in time by one clock, of means 104 for determining are each equal to the input signals and the output signals of a processing step in one round. In this concrete case of the realization, the use of intermediate signals or auxiliary signals is not required.

Figure 3:
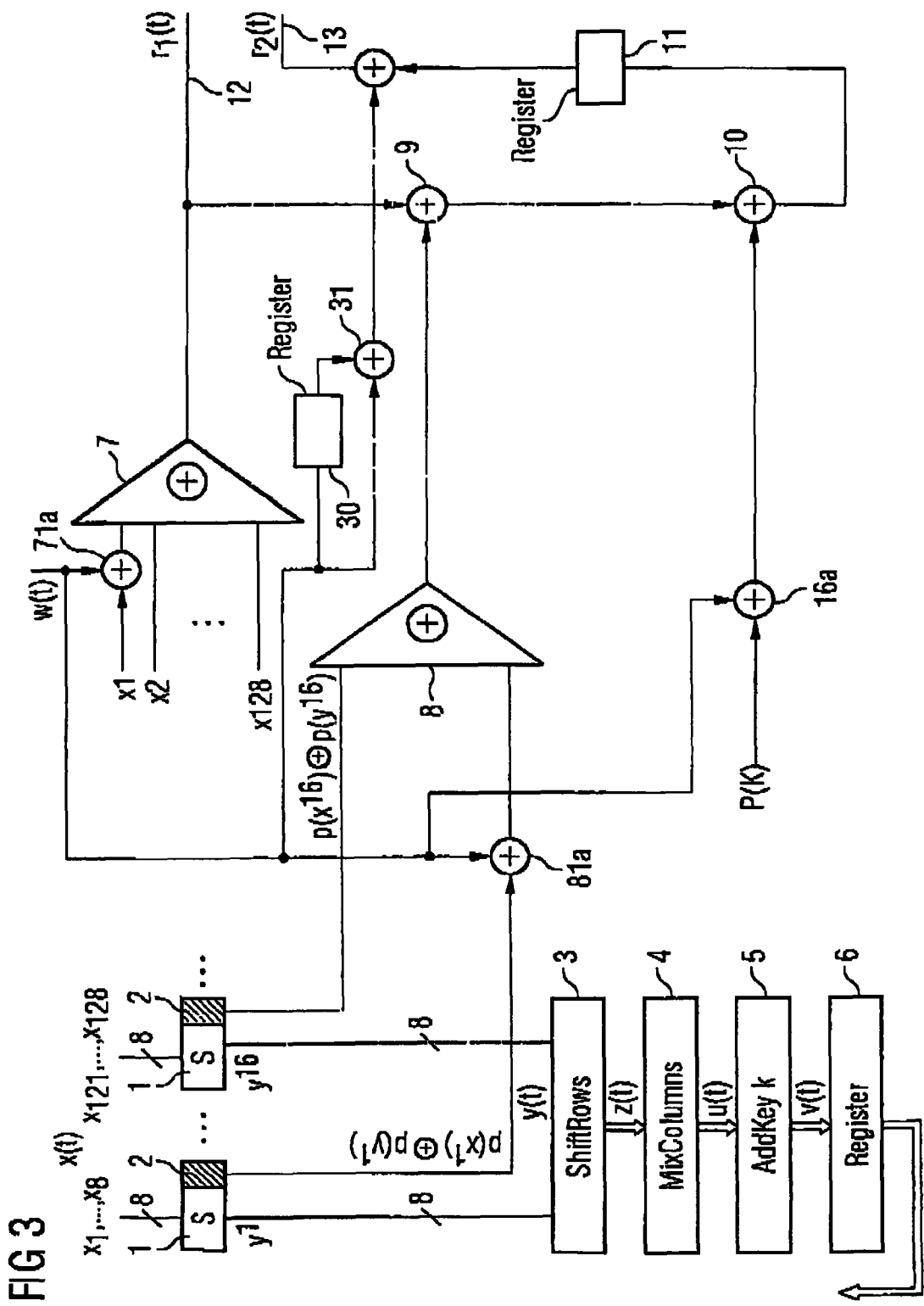
FIG. 3 is a block circuit diagram of an instantiated embodiment of the apparatus for recognizing a failure in a cryptographic unit.

For better understanding, now a special embodiment of the invention for L=0 of FIG. 3 is to be considered.

Here, we choose the coefficients in the above-mentioned equation (1) at $a_1 = b_1 = c = e = 1$ and all other values at 0 and $h_1(t) = k_1(t) = p(t) = w(t)$ and $r(t) = w(t) \oplus w(t-1)$ wherein w(t) is a pseudo-random sequence. Thus, it can be seen that the pseudo-random sequence r(t) is the XOR sum of successive values of the pseudo-random sequence w(t).

From equation (1), then $$h_1(t) \oplus h_1(t-1) \oplus k_1(t-1) \oplus p(t-1) + r(t) = w(t) \oplus w(t-1) \oplus w(t-1)(w(t-1) \oplus w(t) \oplus w(t-1)) = 0$$

results, and an error in the cryptographic unit is recognized if $r_1$ and $r_2$ differ.

The value w(t) is added to r, and the value $$w(t-1) \oplus w(t-1) \oplus w(t-1) \oplus w(t) \oplus w(t-1) = w(t) \mathrm{modulo}\ 2$$

to $r_2$, wherein w(t) is a pseudo-random sequence, as set forth above, so that the parity of the values $x_1, \ldots, x_{128}$ of the inputs can no longer be deduced from the value of $r_1(t)$ without reducing the error recognition property of the circuit.

FIG. 3 shows this embodiment of the inventive apparatus for recognizing a failure in a cryptographic unit. Here, the parts of the circuit equal to those in FIG. 2 are designated the same in FIG. 3, and they are not to be described here again in detail.

The values of the pseudo-random signal w(t) are at the same time present at the second input each of the XOR gates 71a, 81a, and 16a, since the constant multipliers a1 71, b1 81, and c16 are each equal to 1, while the constant multipliers $a_2, \ldots, a_{128}, b_2, \ldots, b_{16}$, a14, b15, d17, and f19 shown in FIG. 2, for example, are omitted or may be assumed with a value of 0.

Moreover, the pseudo-random signal w(t) at the same time is present at the input of a binary register 30 and at the first input of the XOR gate 31, to the second input of which the output of the register 30 is attached, and the output of which is directly connected to the second input of the XOR gate 16a, since the constant multiplier e 11 is equal to 1 (or is set to the value 1 according to assumptions).

The output of the XOR gate 31 thus provides a value taking on the value $$r(t) = w(t) \oplus w(t+1)$$

with reference to the signal r(t) in FIG. 2.

Figure 7A:
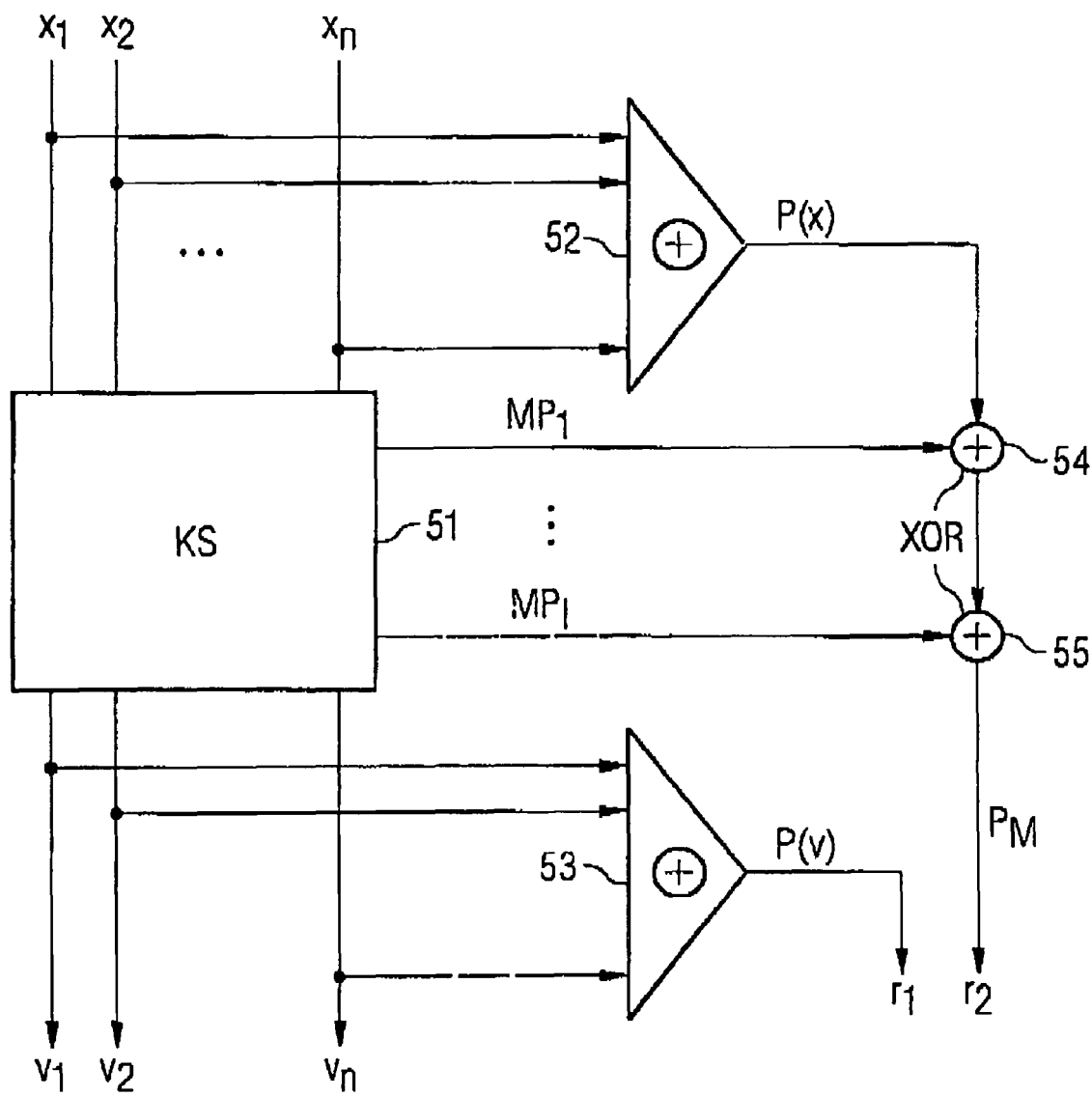
FIG. 7A is a block circuit diagram of a conventional apparatus for recognizing a failure in a cryptographic unit.
Figure 7B:
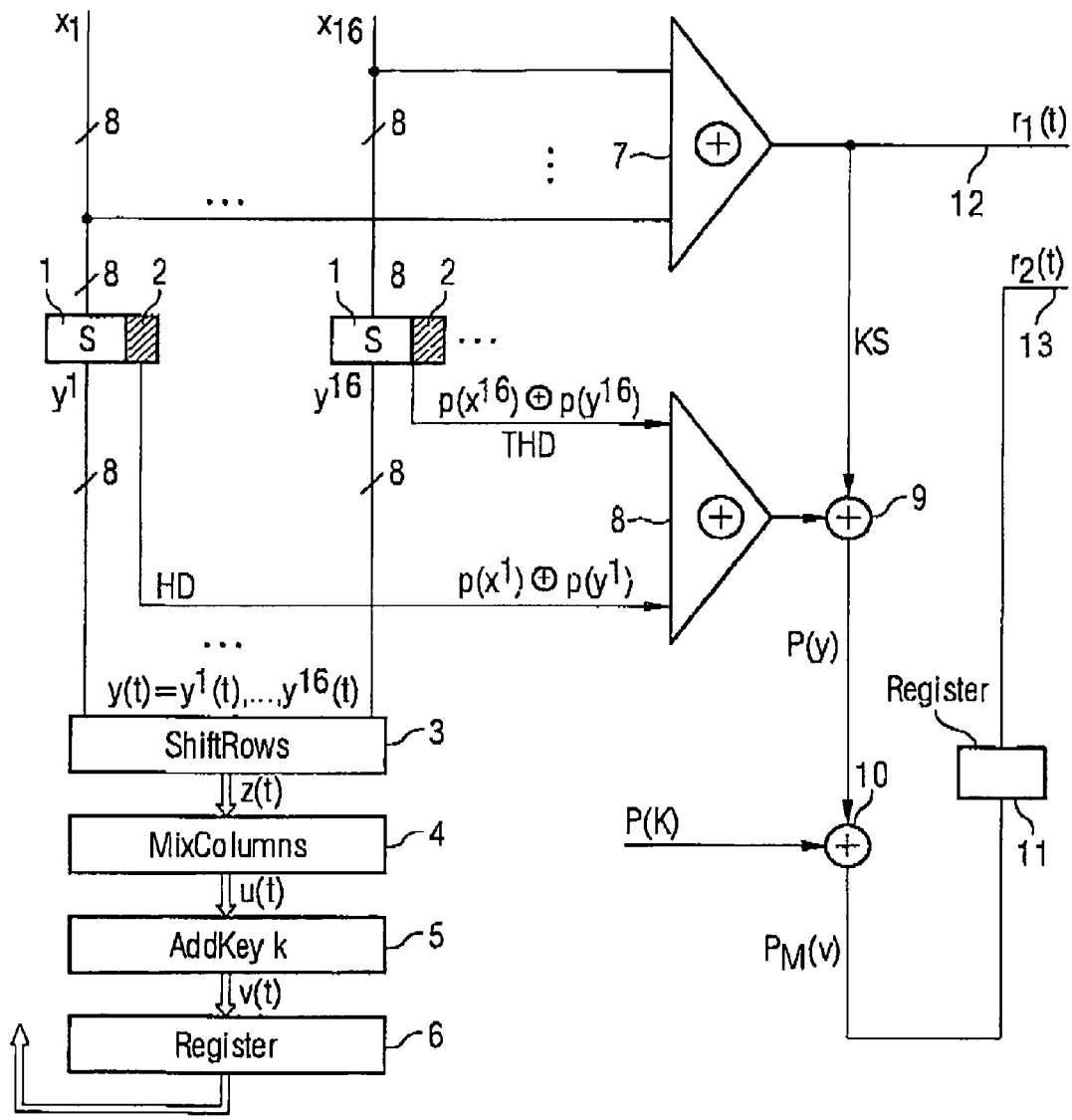
FIG. 7B is a block circuit diagram of a further conventional apparatus for recognizing a failure in a cryptographic unit.

FIG. 4A shows a second example of an inventive cryptographic circuit KS. The circuit parts not differing from the cryptographic circuit illustrated in FIG. 7A are designated in FIG. 4A as in FIG. 7A and are therefore not to be described again in detail.

The output signal of the XOR tree 52 is connected both to the first input of the XOR gate 54, at the second input of which the modifying parity signal $MP_1$ is present, and the output of which is connected to the first input of the XOR gate 55 and to the first input of the XOR gate 64, at the second input of which the negated output of the 1 bit wide register 65 is present. The output of the XOR gate 64 is directly connected to the first output $r_1$ carrying the error signal. The line carrying the random signal $w_1$ is connected to the input of the 1 bit wide register 65.

The modifying parity signal $MP_2$ is connected to the first input of an XOR gate 63, at the second input of which the random signal $w_1$ is present, and the output of which is connected to the first input of the XOR gate 55, the second input of which is connected to the output of the XOR gate 54. The output of the XOR gate 55 is connected to the second output $r_2$ carrying the error signal via the 1 bit wide register 66. The outputs $v_1, \ldots, v_n$ of the cryptographic circuit KS 51 in the i-th round are fed back onto the inputs of the cryptographic circuits via the n bit wide register 67 in the (i+1)-th round, as illustrated by the bent arrow in FIG. 4A.

Since the output of the 1 bit wide register 65 is negated, the outputs $r_1$ and $r_2$ are inverse with respect to each other, as long as no error is present. If the outputs $r_1$ and $r_2$ are equal, an error will be recognized.

Here, an even or odd number of ones in the data also cannot be deduced from the error signals $r_1$ and $r_2$, since the random signal $w_1$, which is, for example, generated by a physical random source and is not predictable, is XORed with the signals to be monitored, the signal output at the output of the XOR tree 52 at the present time instant, and the signal output at the output of the XOR tree 52 at the previous time instant and modified by the modifying parities $MP_1$ and $MP_2$.

Figure 4B:
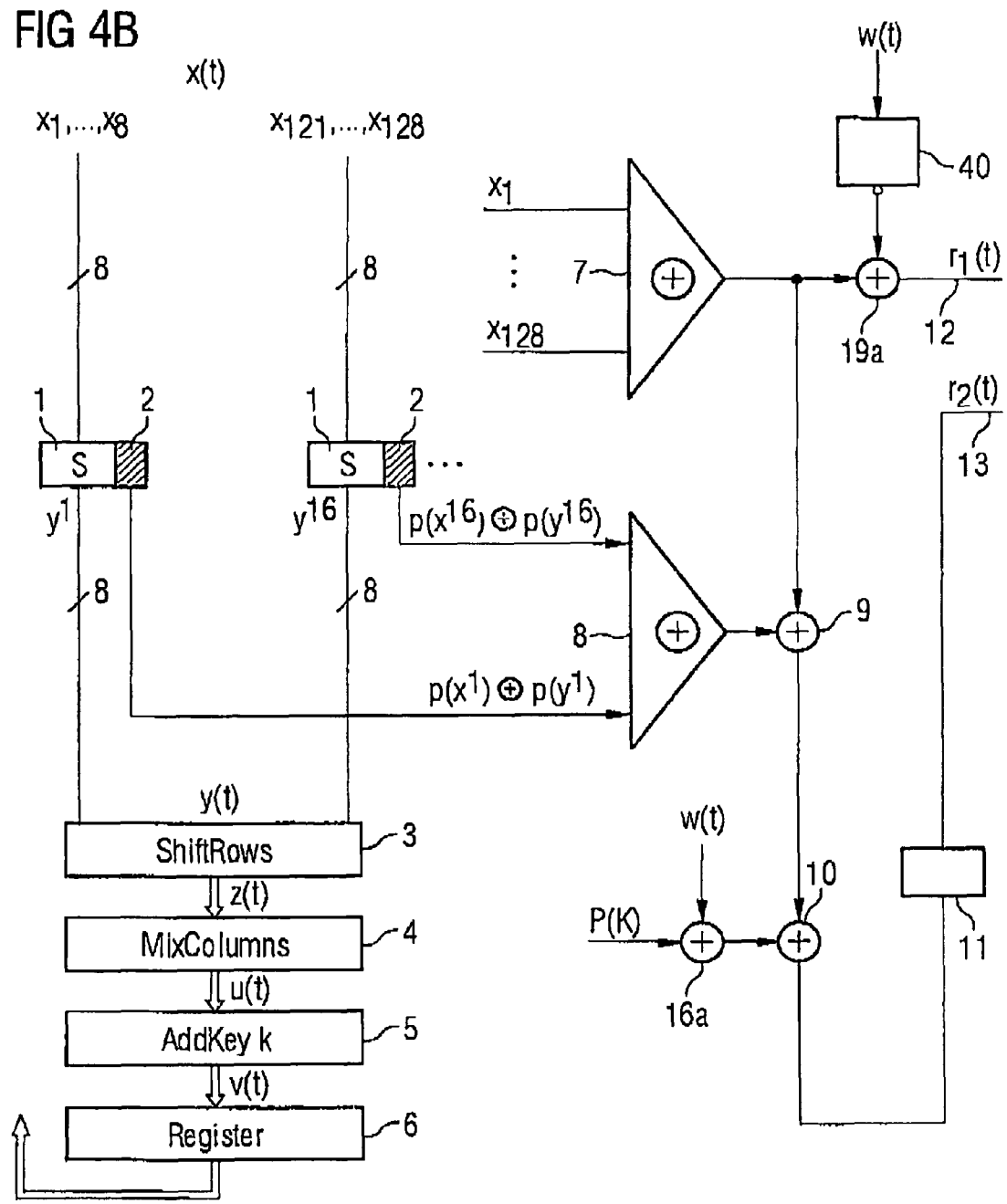
FIG. 4B is a block circuit diagram of a further instantiated embodiment of the apparatus for recognizing a failure in a cryptographic unit.

In FIG. 4B a further embodiment of an inventive apparatus for recognizing a failure of a cryptographic unit is illustrated, for which a value of 1 was chosen for the variable L. In FIG. 4B the parts of the circuit in which FIG. 2 and FIG. 4B are equal are designed the same and therefore are not described further in more detail.

With reference to the illustration in FIG. 2, for the embodiments according to FIG. 4B, the constant multiplier values f=c=1, the signal s(t)=w(t−1) and p(t)=w(t) were chosen. All other constant multiplier values were set to 0, whereby the circuit structure illustrated in FIG. 4 results.

From equation (1)

$$s(t) \oplus p(t-1) \oplus 1 = w(t-1) \oplus w(t-1) \oplus 1 = 0$$

then results, and the output signals $r_1(t)$ and $r_2(t)$ are unequal to 1, as long as no error is recognized in the circuit.

It is also to be noted here that the parity of the input signals $x_1, \ldots, x_{128}$ cannot be deduced from the values of $r_1(t)$ and $r_2(t)$, since the values for $r_1(t)$ and $r_2(t)$ are modified by the pseudo-random signal w(t). The value of the pseudo-random signal w(t) at the same time is present at the input of the register 40 and at the second input of the XOR gate 16a.

In the register 40, the value of w(t) is stored for one clock and input into the second input of the XOR gate 19a in inverted manner. At the negated output of the register 40, the value of the pseudo-random function s(t)=w(t−1) is formed.

The values of the functions s(t) and p(t) are directly present at the respective second inputs of the XOR elements 19a and 16a, since the values f and c of the constant multipliers 19 and 16 are each equal to 1.

In a further embodiment, also two pseudo-noise sequences different from each other may be used, and these can be suitably linked with the input data and the output data for obtaining the secured output signals $r_1(t)$ and $r_2(t)$. Here, it is to be noted that the further PN sequence is again inserted into the two processing branches in equal manner, so that the effect of the further PN sequence on the input control signal $r_1(t)$ and the output control signal $r_2(t)$ can be compensated for. This may, for example, take place with reference to FIGS. 2 and 4 such that the further PN sequence w'(t)=h(t)=r(t) if the constant multiplier values a=e=1 are chosen. The first PN sequence w(t) may, for example, be processed as illustrated in FIG. 4 for the output control signal $r_1(t)$ and the input control signal $r_2(t)$. The use of a second PN sequence offers the advantage of enabling additional security of the input control signal and the output control signal against spying out the input data x or the key K.

In principle, it is to be noted with respect to the inventive approach that the security data, preferably in the form of an easy-to-generate PN sequence of PN sequences, are used uniformly at both processing branches for establishing at least one input control signal $r_1(t)$ and at least one output control signal $r_2(t)$. This may take place on the one hand by the security data being used in an odd number of uses for the output control signal or the input control signal in a non-delayed path, as it is possible, for example, in FIG. 3 by the link with the XOR gate 71a and the XOR gate 31 without the use of the register output of the register 30. Furthermore, also all odd multiple links of the security data (i.e. the encryption number) or the PN sequence with the input control signal and the output control signal may lead to an equivalent result. The same also applies by analogy for an even number of links of the security data for calculating the input control signal and the output control signal. But if an even number of links is used in one processing path, and an odd number of links is used in the parallel other processing path, this results in a relation of the input control signal to the output control signal such that the input control signal exactly comprises the complementary bit to the bit present at the output control signal in a binary representation. The same also applies in the insertion (of an odd number) of inverters into one of both processing branches as opposed to the corresponding parallel other processing branch. Such an odd number of inverters is illustrated in FIG. 4B, for example, with the inverter following the register 40 (characterized as a solid dot in FIG. 4B).

For determining the relation between the input control signal and the output control signal, however, also the effect of delay stages, such as the registers 11 and 40 in FIG. 4B, is to be taken into account. This means that a PN sequence (or a random number determined by physical phenomena, such as radioactive decay) is to be delayed in both parallel processing branches for generating the input control signal and the output control signal in an identical manner, as this is, for example, caused by the delaying effect of the register 40 and the delay of the register 11 in FIG. 4B. This means that the PN sequence w(t) in each of both processing branches for calculating the input control signal or the output control signal is delayed by one clock each, and thus the relation of the input control signal to the output control signal is not corrupted by an "unequal" delay in one of both paths.

Furthermore, it is to be noted that the proposed approach for recognizing a failure of a cryptographic unit may preferably be employed for an application of the previously described AES algorithm in the cryptographic unit. Here, in the cryptographic unit, the various processing stages characterized with the reference numerals 1 to 6 are cycled through. By the use of the input data x and the output data y from the S box 1 and using the parity of the key K added in the stage AddKey K 5, thus, for example, a parity change generated by the encryption/decryption key K in the input data x of the subsequent round may also be taken into account, since the parity change is taken into account in the AES algorithm by the parity P(K) and the delay in the register 11 for the subsequent round for the recognition of a failure of the cryptographic unit. Hence, this means that a parity change of the signals $x^1, \ldots, x^{16}$ at the end of a round of the AES algorithm (i.e. in the signal v(t)) is taken into account if the delayed signals y(t) are used as input signals x(t+1) of the next round for the next round. By taking the parity of the round key K used into account, thus a constant relation between the output control signal and the input control signal may be established, in which exclusively the effect of processing the input data in the S box 1 or the S boxes 1 has an influence on the relation between the input control signal and the output control signal.

Figure 5:
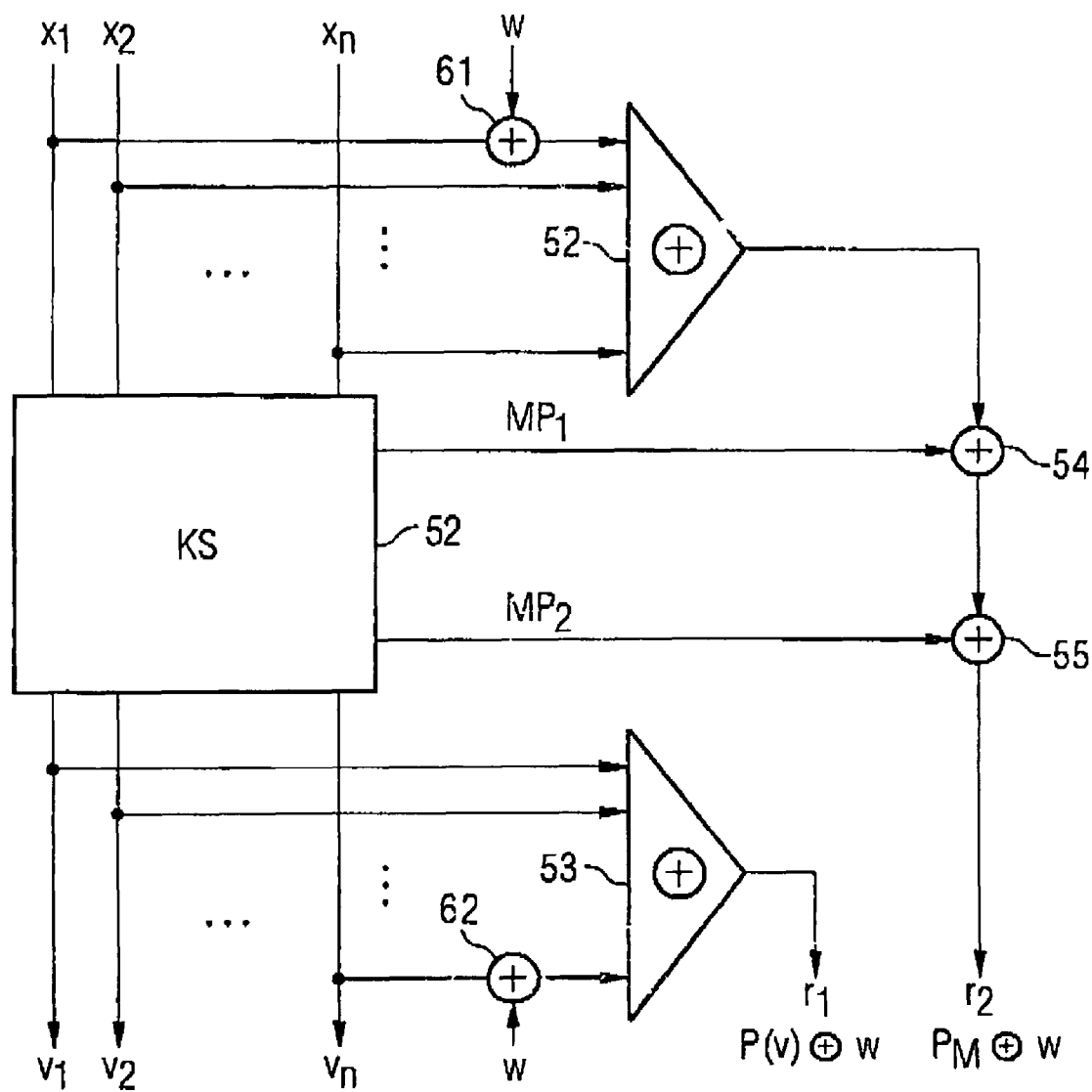
FIG. 5 is a block circuit diagram of a further embodiment of the apparatus for recognizing a failure in a cryptographic unit.

FIG. 5 shows a further embodiment of an inventive cryptographic circuit KS. In FIG. 5, the circuit parts not differing from the cryptographic circuit illustrated in FIG. 7A are designated as in FIG. 7A and are therefore not to be described again in detail. The line carrying the input signal $x_1$ of the cryptographic circuit 51, which is connected both to the first input of the cryptographic circuit 51 and directly to the first input of the XOR tree 52 in FIG. 7A, is connected to the first input of an XOR gate 61 in FIG. 5, at the second input of which a pseudo-random signal w is present, and the output of which is connected to the first input of the XOR tree 52. The line carrying the output signal $v_n$ of the cryptographic circuit 51, which is directly connected to the n-th input of the XOR tree 53 in FIG. 7A, is connected to the first input of an XOR gate 62 in FIG. 5, at the second input of which the pseudo-random signal w is present, and the output of which is connected to the n-th input of the XOR tree 53. At the outputs $r_1$ and $r_2$ of the circuit of FIG. 5, now the values $P(v) \oplus w$ and $P_M \oplus w$ are compared. It is noted that it can no longer be deduced from the values $P(v) \oplus w$ and $P_M \oplus w$ whether the number of ones in the output signals $v_i, \ldots, v_n$ is even or odd, since the value of the pseudo-random signal w is not known. Even so, it is possible, however, to recognize an error in the inequality of $r_1$ and $r_2$.

Figure 6:
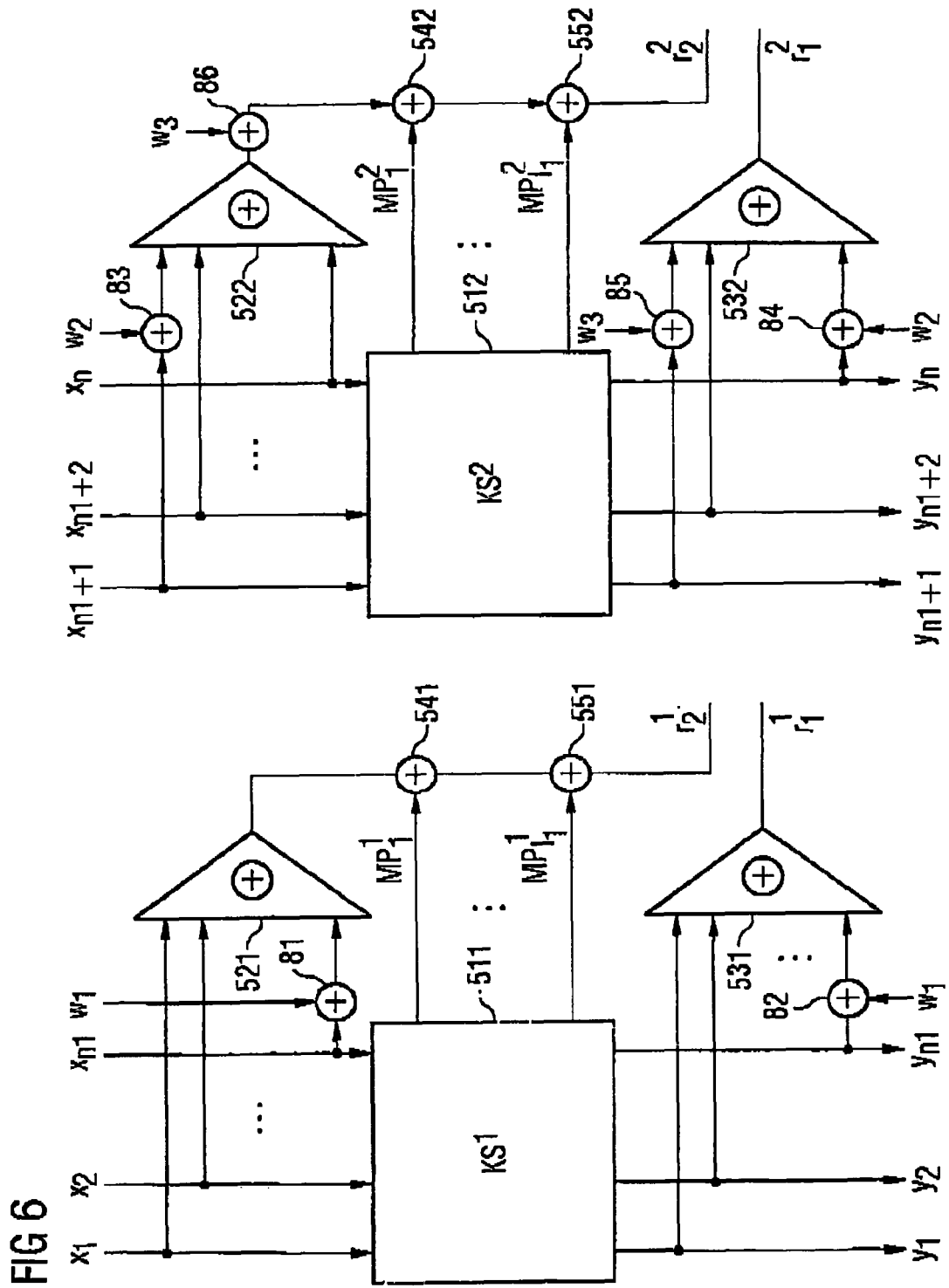
FIG. 6 is a block circuit diagram of a further embodiment of the apparatus for recognizing a failure in a cryptographic unit.

FIG. 6 shows a further inventive circuit consisting of two circuit parts $KS^1$ 511 and $KS^2$ 512 and monitored by two parities.

The $n_1$ binary input signals $x_1, \ldots, x_{n1}$ are input into the first circuit part $KS^1$ 511, and the $n_1$ binary output signals $y_1, \ldots, y_{n1}$ are output. In the XOR tree 521, the parity of the input signals $x_1, \ldots, x_{n1}$ is formed, wherein the input signal $x_{n1}$ is connected to the first input of the XOR gate 81, at the second input of which the random signal $w_1$ is present, and the output of which is connected to the $n_1$-th input of the XOR tree 521, so that the parity modified by the random signal $w_1$ of the input values $$x_1 \oplus x_2 \oplus \ldots \oplus x_{n1} \oplus w_1 = P(x_1, \ldots, x_{n1}) \oplus w_1$$

present at $KS^1$ is output at the output of the XOR tree 521.

This signal is XORed with the modifying parities $MP_1^1, \ldots, MP_{11}^1$ in the XOR gates 541 and 551 into the error signal $r_2^1 = P^1_M \oplus w_1$. In the XOR tree 531, the parity of the output signals $y_1, \ldots, y_{n1}$ is formed, wherein the output signal $y_{n1}$ is connected to the first input of the XOR gate 82, at the second input of which the random signal $w_1$ is present, and the output of which is connected to the $n_1$-th input of the XOR tree 531, so that the parity modified by the random signal $w_1$ of the output values $$y_1 \oplus y_2 \oplus \ldots \oplus y_{n1} \oplus w_1 = P(y_1, \ldots, y_{n1}) \oplus w_1$$

present at $KS^1$ is output at the output of the XOR tree 531.

Since in the error-free case $P(y_1, \ldots, y_{n1}) = PM^1$ and thus also $P(y_1, \ldots, y_{n1}) \oplus w_1 = PM^1 \oplus w_1$ applies, an error in the cryptographic partial circuit $KS^1$ is recognized in the inequality of the outputs $r_2^1$ and $r_1^1$.

The $n_2$ binary input signals $x_{n1+1}, \ldots, x_n$ are input into the second circuit part $KS^2$ 512, and the binary output signals $y_{n1+1}, \ldots y_n$ are output. In the XOR tree 521, the parity of the input signals $x_{n1+1}, \ldots, x_n$ is formed, wherein the input signal $x_{n1+1}$ is connected to the first input of the XOR gate 83, at the second input of which the random signal $w_2$ is present, and the output of which is connected to the first input of the XOR tree 522, so that the parity modified by the random signal $w_2$ of the input values $$x_{n1+1} \oplus x_{n1+1} \oplus \ldots \oplus x_n \oplus w_2 = P(x_{n1+1}, \ldots, x_n) \oplus w_2$$

present at $KS^1$ 2, which is linked with the random signal $w_3$ in the XOR gate 86 into $P(x_{n1+1}, \ldots, x_n) \oplus w_2 \oplus w_3$, is output at the output of the XOR tree 522.

This signal is XORed with the modifying parities $MP_1^2, \ldots MP_{12}^2$ in the XOR gates 542 and 552 into the error signal $r_2^2 = P_M^2 \oplus w_2 \oplus w_3$. In the XOR tree 532, the parity of the output signals $y_{n1+1}, \ldots, y_{n1}$ is formed, wherein the output signal $y_{n1+1}$ is connected to the first input of the XOR gate 85, at the second input of which the random signal $w_2$ is present, and the output of which is connected to the first input of the XOR tree 532, wherein the output signal $y_{n1+1}$ is connected to the first input of the XOR gate 84, at the second input of which the random signal $w_3$ is present, and the output of which is connected to the (n−n₁)-th input of the XOR tree 532, so that the parity modified by the random signals $w_2$ and $w_3$ of the output values $$y_{n_1+1} \oplus \ldots \oplus y_n \oplus w_2 \oplus w_3 = P(y_{n_1+1}, \ldots, y_n) \oplus w_2 \oplus w_3$$

output from KS² is output at the output of the XOR tree 532.

Since in the error-free case $P(y_{n_1+1}, \ldots, y_n) = PM^2$ and thus also $P(y_{n_1+1}, \ldots, y_n) \oplus w_2 \oplus w_3 = PM^1 \oplus w_2 \oplus w_3$ applies, an error in the cryptographic partial circuit KS¹ is recognized in the inequality of the outputs $r_2^2$ and $r_1^2$.

It can be seen that the cryptographic circuit consisting of the circuit parts KS¹ and KS² is monitored by k=2 parity signals, and that the XOR sum of the random or pseudo-random signals acting on the respective outputs to be compared, which carry the error signals, are each the same.

Thus, for the outputs $r_2^2$ and $r_1^2$ of the partial circuit K these XOR sums are each equal to $w_2 \oplus w_3$ and $w_1$ each for the outputs $r_2^1$ and $r_1^1$, since for the circuit KS¹, the sum only consists of the one addend $w_1$.

Means 106 for evaluating here compares the signals $r_2^2$ and $r_1^2$ and the signals $r_2^1$ and $r_1^1$ and derives an error signal therefrom in a manner known to one skilled in the art.

Depending on the conditions, the inventive method for recognizing a failure in a cryptographic unit may be implemented in hardware or in software. The implementation may take place on a digital storage medium, in particular a floppy disc or a CD, with electronically readable control signals able to cooperate with a programmable computer system so that the corresponding method is executed. In general, the invention thus also consists in a computer program product with program code stored on a machine-readable carrier for performing the inventive method, when the computer program product is executed on a computer. In other words, the invention may thus be realized as a computer program with program code for performing the method, when the computer program is executed on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for recognizing a failure in a cryptographic unit, with the cryptographic unit being formed to determine output signals from input signals, and with the apparatus for recognizing comprising:
   a determinator configured to determine at least one input control signal and at least one output control signal, with the determinator being formed to determine the input control signal on the basis of an encryption of an input signal control parity of a group of the input signals or an input signal of the group of input signals with an encryption number and to determine the output control signal on the basis of an encryption of an output signal control parity of a group of the output signals or an output signal of the group of output signals with the encryption number; and
   an evaluator configured to evaluate the input control signal and the output control signal to recognize a failure of the cryptographic unit on the basis of a comparison between the input control signal and the output control signal;
   wherein the cryptographic unit is formed to use a cryptographic key configured to determine the output signals from the input signals, and wherein the determinator is formed to encrypt the cryptographic key with the encryption number.

2. The apparatus for recognizing a failure in a cryptographic unit of claim 1, wherein the determinator is formed to determine the encryption on the basis of an EXCLUSIVE OR or on the basis of an EXCLUSIVE NOR operation.

3. The apparatus for recognizing a failure in a cryptographic unit of claim 1, wherein the determinator is formed to use a random number or a pseudo-random number as the encryption number.

4. The apparatus for recognizing a failure in a cryptographic unit of claim 1, wherein the determinator is formed to obtain the input control signal on the basis of a first encryption structure and to obtain the output control signal on the basis of a second encryption structure, wherein a design of the second encryption structure is dependent on a design of the first encryption structure, and wherein the first and second encryption structures are formed to adjust a predefined relation between the input control signal and the output control signal.

5. The apparatus for recognizing a failure in a cryptographic unit of claim 1, wherein the determinator is formed to delay encrypting with the encryption number.

6. The apparatus for recognizing a failure in a cryptographic unit of claim 1, wherein the determinator is formed to perform encrypting on the basis of a negated encryption number.

7. The apparatus for recognizing a failure in a cryptographic unit of claim 1, wherein the cryptographic unit is formed to obtain intermediate signals from the input signals, wherein the determinator is formed to perform an encryption of an intermediate signal control parity of a group of the intermediate signals or an intermediate signal of the group of intermediate signals with the encryption number in determining the input control signal.

8. The apparatus for recognizing a failure in a cryptographic unit of claim 7, wherein the intermediate signals are modifying parities.

9. The apparatus for recognizing a failure in a cryptographic unit of claim 1, wherein the determinator is formed to perform determining the input control signal on the basis of an encryption with a further encryption number and to perform determining the output control signal on the basis of an encryption with the further encryption number.

10. The apparatus for recognizing a failure in a cryptographic unit of claim 1, wherein the determinator is formed to determine a further input control signal and a further output control signal, wherein the determinator is further formed to encrypt a further input control signal parity of a further group of the input signals or an input signal of the further group of input signals with a security number for determining the further input control signal and to encrypt a further output control parity of a further group of the output signals or an output signal of the further group of output signals with the security number for determining the further output control signal, wherein the further group of input signals differs from the group of input signals and the further group of output signals differs from the group of output signals, and wherein the evaluator is formed to recognize a failure of the cryptographic unit on the basis of a comparison of the further input control signal with the further output control signal.

11. The apparatus for recognizing a failure in a cryptographic unit of claim 10, wherein the determinator is formed to use a random number or a pseudo-random number as the security number.

12. The apparatus for recognizing a failure in a cryptographic unit of claim 10, wherein the determinator is formed to use the random number as the security number.

13. The apparatus for recognizing a failure in a cryptographic unit of claim 10, wherein the evaluator is formed to perform recognizing a failure of the cryptographic unit alternatingly on the basis of a comparison between the input control signal and the output control signal or on the basis of a comparison between the further input control signal and the further output control signal.

14. The apparatus for recognizing a failure in a cryptographic unit of claim 10, wherein the evaluator is formed to recognize a failure of the cryptographic unit if the comparison between the input control signal and the output control signal and at the same time the comparison between the further input control signal and the further output control signal provide a negative result.

15. The apparatus for recognizing a failure in a cryptographic unit of claim 10, wherein the determinator is formed to perform determining the further input control signal on the basis of an encryption with a further security number and to perform determining the further output control signal on the basis on an encryption with the further security number.

16. The apparatus for recognizing a failure in a cryptographic unit of claim 1, wherein the determinator is formed to cause the input control signal and the output control signal to differ in failure-free operation of the cryptographic unit at a first time instant and not to differ at a second time instant, and wherein the evaluator is further formed to recognize a failure of the cryptographic unit if the input control signal and the output control signal do not differ at the first time instant and differ at the second time instant.

17. The apparatus for recognizing a failure in a cryptographic unit of claim 1, wherein the cryptographic unit transforms the input data $x(t)=x_1(t), \ldots, x_n(t)$ in the partial circuits for the operations Sub-Bytes, Shift Row, Mix-Columns, and Add-Key step by step into the data $y(t)=y_1(t), \ldots, y_n(t)$, $z(t)=z_1(t), \ldots, z_n(t)$, $ŭ(t)=u_1(t), \ldots, u_n(t)$, $v(t)=v_1(t), \ldots, v_n(t)$ for the realization of the AES algorithm with a word width n, and the output data of the cryptographic unit at the time instant t are designated with v(t), and the operation Sub-Bytes is realized each by S boxes of the input and output word width 8, and the determinator, for the respective j-th S box for $j=1, \ldots, n/8$, realizes an additional ninth output, which realizes the XOR sum $p(x^j) \oplus p(y^j)$ of the parity $p(x^j)$ of the inputs present at the inputs thereof and the parity $p(y^j)$ of the outputs present at the respective outputs thereof, and further, in the determinator, for $i=1, \ldots, n$, the input $x_i$ is connected to the first input of an XOR gate, to the second input of which the output of a constant multiplier is connected, the input of which carries the pseudo-random or random signal $h_i(t)$, and the output of the XOR gate is connected to the i-th input of an XOR tree with n inputs and an output, the output of which is connected to the first input of an XOR gate, at the second input of which the output of the constant multiplier is present, and the input of which is connected to the random or pseudo-random signal h(t), and the output of which is at the same time connected to the first input each of the XOR gates, and the respective additional output carrying the signal $p(x^j) \oplus p(y^j)$ of the j-th S box is connected to the first input of the XOR gate, at the second input of which the output of the constant multiplier is present, at the input of which the random or pseudo-random signal $k_j(t)$ is present, and the output of the XOR gate is connected to the j-th input of the XOR tree with n/8 inputs and an output, the output of which is connected to the first input of an XOR gate, the second input of which is connected to the output of a constant multiplier, at the input of which a random or pseudo-random signal k(t) is present, and the output of which is connected to the second input of the XOR gate, the output of which is connected to the first input of the XOR gate, the second input of which is connected to the output of the XOR gate, at the first input of which the value P(K) of the parity of the current key K is present, and the second input of which is connected to the output of the constant multiplier, at the input of which the random or pseudo-random signal p(t) is present, and the output of the XOR gate is connected to the first input of the XOR gate, at the second input of which the output of the constant multiplier is present, at the input of which the random or pseudo-random signal q(t) is present, and the output of which is connected, via a register, to the first input of an XOR gate, the second input of which is connected to the output of a constant multiplier, at the input of which the random or pseudo-random signal r(t) is present, and the output of which is connected to the second output of the determinator, which carries the output control signal $AKS=r_2(t)$, and the second input of the XOR gate is connected to the output of the constant multiplier, at the input of which the random or pseudo-random signal s(t) is present, and the output of which is connected to the first output of the determinator, which carries the input control signal $EKS=r_1(t)$, and the evaluator compares the signals $r_1(t)$ and $r_2(t)$, wherein the binary coefficients $a_1, \ldots, a_n, b_1, \ldots, n_{n/8}$, a, b, c, d, e, f and the random or pseudo-random signals $h_1(t), \ldots, h_n(t), k_1(t), \ldots, k_{n/8}, h(t), k(t), p(t), q(t), r(t), s(t)$ satisfy the condition $$a_1 h_1(t) \oplus a_2 h_2(t) \oplus \ldots \oplus a_{128} h_{128}(t) \oplus a(t) h(t) \oplus fs(t)$$

$$\oplus a_1 h_1(t-1) \oplus a_2 h_2(t-1) \oplus \ldots \oplus a_{128} h_{128}(t-1) + ah(t-1)$$

$$b_1 k_1(t-1) \oplus \ldots \oplus b_{16} k_{16}(t-1) + bk(t-1)$$

$$\oplus cp(t-1) \oplus dq(t-1) \oplus er(t) \oplus L=0,$$

and in case a constant multiplier takes on the binary value 0, this constant multiplier and the corresponding XOR gate, at the one input of which the output thereof is present, are simply omitted, and the line present at the other input of this XOR gate is simply drawn through, and, if a constant multiplier takes on the value 1, the line present at its input is directly drawn through onto the input of the XOR gate to which the output of this constant multiplier is connected.

18. The apparatus for recognizing a failure in a cryptographic unit of claim 17, wherein the evaluator is formed to perform an XOR operation of the output signals $r_1 \oplus r_2$.

19. A method of recognizing a failure in a cryptographic unit, with the cryptographic unit being formed to use a cryptographic key for determining output signals from input signals, and with the method for recognizing comprising:
  encrypting the cryptographic key with an encryption number;
  determining an input control signal and an output control signal to determine the input control signal on the basis of an encryption of an input signal control parity of a group of the input signals or an input signal of the group of input signals with the encryption number and to determine the output control signal on the basis of an encryption of an output signal control parity of a group of the output signals or an output signal of the group of output signals with the encryption number; and
  evaluating the input control signal and the output control signal to recognize a failure of the cryptographic unit on the basis of a comparison between the input control signal and the output control signal.

20. A non-transitory computer readable medium having stored thereon a program code for performing, when the computer program is executed on a computer, the method of recognizing a failure in a cryptographic unit, with the cryptographic unit being formed to use a cryptographic key for determining output signals from input signals, and with the method for recognizing comprising:

encrypting the cryptographic key with an encryption number;

determining an input control signal and an output control signal to determine the input control signal on the basis of an encryption of an input signal control parity of a group of the input signals or an input signal of the group of input signals with the encryption number and to determine the output control signal on the basis of an encryption of an output signal control parity of a group of the output signals or an output signal of the group of output signals with the encryption number; and evaluating the input control signal and the output control signal to recognize a failure of the cryptographic unit on the basis of a comparison between the input control signal and the output control signal.

21. An apparatus for recognizing a failure in a cryptographic unit, with the cryptographic unit being formed to determine output signals from input signals, and with the apparatus for recognizing comprising:

a determinator configured to determine at least one input control signal and at least one output control signal, with the determinator being formed to determine the input control signal on the basis of an encryption of an input signal control parity of a group of the input signals or an input signal of the group of input signals with an encryption number and to determine the output control signal on the basis of an encryption of an output signal control parity of a group of the output signals or an output signal of the group of output signals with the encryption number; and an evaluator configured to evaluate the input control signal and the output control signal to recognize a failure of the cryptographic unit on the basis of a comparison between the input control signal and the output control signal;

wherein the cryptographic unit is formed to obtain intermediate signals from the input signals, wherein the determinator is formed to perform an encryption of an intermediate signal control parity of a group of the intermediate signals or an intermediate signal of the group of intermediate signals with the encryption number in determining the input control signal.

22. The apparatus for recognizing a failure in a cryptographic unit of claim 21, wherein the intermediate signals are modifying parities.

23. An apparatus for recognizing a failure in a cryptographic unit, with the cryptographic unit being formed to determine output signals from input signals, and with the apparatus for recognizing comprising:

a determinator configured to determine at least one input control signal and at least one output control signal, with the determinator being formed to determine the input control signal on the basis of an encryption of an input signal control parity of a group of the input signals or an input signal of the group of input signals with an encryption number and to determine the output control signal on the basis of an encryption of an output signal control parity of a group of the output signals or an output signal of the group of output signals with the encryption number; and an evaluator configured to evaluate the input control signal and the output control signal to recognize a failure of the cryptographic unit on the basis of a comparison between the input control signal and the output control signal;

wherein the determinator is formed to determine a further input control signal and a further output control signal, wherein the determinator is further formed to encrypt a further input control signal parity of a further group of the input signals or an input signal of the further group of input signals with a security number for determining the further input control signal and to encrypt a further output control parity of a further group of the output signals or an output signal of the further group of output signals with the security number for determining the further output control signal, wherein the further group of input signals differs from the group of input signals and the further group of output signals differs from the group of output signals, and wherein the evaluator is formed to recognize a failure of the cryptographic unit on the basis of a comparison of the further input control signal with the further output control signal.

24. The apparatus for recognizing a failure in a cryptographic unit of claim 23, wherein the determinator is formed to use a random number or a pseudo-random number as the security number.

25. The apparatus for recognizing a failure in a cryptographic unit of claim 23, wherein the determinator is formed to use the random number as the security number.

26. The apparatus for recognizing a failure in a cryptographic unit of claim 23, wherein the evaluator is formed to perform recognizing a failure of the cryptographic unit alternatingly on the basis of a comparison between the input control signal and the output control signal or on the basis of a comparison between the further input control signal and the further output control signal.

27. The apparatus for recognizing a failure in a cryptographic unit of claim 23, wherein the evaluator is formed to recognize a failure of the cryptographic unit if the comparison between the input control signal and the output control signal and at the same time the comparison between the further input control signal and the further output control signal provide a negative result.

28. The apparatus for recognizing a failure in a cryptographic unit of claim 23, wherein the determinator is formed to perform determining the further input control signal on the basis of an encryption with a further security number and to perform determining the further output control signal on the basis on an encryption with the further security number.

29. An apparatus for recognizing a failure in a cryptographic unit, with the cryptographic unit being formed to determine output signals from input signals, and with the apparatus for recognizing comprising:

a determinator configured to determine at least one input control signal and at least one output control signal, with the determinator being formed to determine the input control signal on the basis of an encryption of an input signal control parity of a group of the input signals or an input signal of the group of input signals with an encryption number and to determine the output control signal on the basis of an encryption of an output signal control parity of a group of the output signals or an output signal of the group of output signals with the encryption number; and an evaluator configured to evaluate the input control signal and the output control signal to recognize a failure of the cryptographic unit on the basis of a comparison between the input control signal and the output control signal;

wherein the determinator is formed to cause the input control signal and the output control signal to differ in failure-free operation of the cryptographic unit at a first time instant and not to differ at a second time instant, and wherein the evaluator is further formed to recognize a failure of the cryptographic unit if the input control signal and the output control signal do not differ at the first time instant and differ at the second time instant.

30. An apparatus for recognizing a failure in a cryptographic unit, with the cryptographic unit being formed to determine output signals from input signals, and with the apparatus for recognizing comprising:

a determinator configured to determine at least one input control signal and at least one output control signal, with the determinator being formed to determine the input control signal on the basis of an encryption of an input signal control parity of a group of the input signals or an input signal of the group of input signals with an encryption number and to determine the output control signal on the basis of an encryption of an output signal control parity of a group of the output signals or an output signal of the group of output signals with the encryption number; and an evaluator configured to evaluate the input control signal and the output control signal to recognize a failure of the cryptographic unit on the basis of a comparison between the input control signal and the output control signal;

wherein the cryptographic unit transforms the input data $x(t)=x_1(t), \ldots, x_n(t)$ in the partial circuits for the operations Sub-Bytes, Shift Row, Mix-Columns, and Add-Key step by step into the data $y(t)=y_1(t), \ldots, y_n(t)$, $z(t)=z_1(t), \ldots, z_n(t)$, $ŭ(t)=u_1(t), \ldots, u_n(t)$, $v(t)=v_1(t), \ldots, v_n(t)$ for the realization of the AES algorithm with a word width n, and the output data of the cryptographic unit at the time instant t are designated with $v(t)$, and the operation Sub-Bytes is realized each by S boxes of the input and output word width 8, and the determinator, for the respective j-th S box for $j=1, \ldots, n/8$, realizes an additional ninth output, which realizes the XOR sum $p(x^j) \oplus p(y^j)$ of the parity $p(x^j)$ of the inputs present at the inputs thereof and the parity $p(y^j)$ of the outputs present at the respective outputs thereof, and further, in the determinator, for $i=1, \ldots, n$, the input $x_i$ is connected to the first input of an XOR gate, to the second input of which the output of a constant multiplier is connected, the input of which carries the pseudo-random or random signal $h_i(t)$, and the output of the XOR gate is connected to the i-th input of an XOR tree with n inputs and an output, the output of which is connected to the first input of an XOR gate, at the second input of which the output of the constant multiplier is present, and the input of which is connected to the random or pseudo-random signal h(t), and the output of which is at the same time connected to the first input each of the XOR gates, and the respective additional output carrying the signal $p(x^j) \oplus p(y^j)$ of the j-th S box is connected to the first input of the XOR gate, at the second input of which the output of the constant multiplier is present, at the input of which the random or pseudo-random signal $k_j(t)$ is present, and the output of the XOR gate is connected to the j-th input of the XOR tree with n/8 inputs and an output, the output of which is connected to the first input of an XOR gate, the second input of which is connected to the output of a constant multiplier, at the input of which a random or pseudo-random signal k(t) is present, and the output of which is connected to the second input of the XOR gate, the output of which is connected to the first input of the XOR gate, the second input of which is connected to the output of the XOR gate, at the first input of which the value $P(K)$ of the parity of the current key K is present, and the second input of which is connected to the output of the constant multiplier, at the input of which the random or pseudo-random signal p(t) is present, and the output of the XOR gate is connected to the first input of the XOR gate, at the second input of which the output of the constant multiplier is present, at the input of which the random or pseudo-random signal q(t) is present, and the output of which is connected, via a register, to the first input of an XOR gate, the second input of which is connected to the output of a constant multiplier, at the input of which the random or pseudo-random signal r(t) is present, and the output of which is connected to the second output of the determinator, which carries the output control signal $AKS=r_2(t)$, and the second input of the XOR gate is connected to the output of the constant multiplier, at the input of which the random or pseudo-random signal s(t) is present, and the output of which is connected to the first output of the determinator, which carries the input control signal $EKS=r_1(t)$, and the evaluator compares the signals $r_1(t)$ and $r_2(t)$, wherein the binary coefficients $a_1, \ldots, a_n, b_1, \ldots, b_{n/8}$, a, b, c, d, e, f and the random or pseudo-random signals $h_1(t), \ldots, h_n(t), k_1(t), \ldots, k_{n/8}$, h(t), k(t), p(t), q(t), r(t), s(t) satisfy the condition $a_1 h_1(t) \oplus a_2 h_2(t) \oplus \ldots \oplus a_{128} h_{128}(t) \oplus a(t) h(t) \oplus fs(t)$ $\oplus a_1 h_1(t-1) \oplus a_2 h_2(t-1) \oplus \ldots \oplus a_{128} h_{128}(t-1) + ah(t-1)$ $b_1 k_1(t-1) \oplus \ldots \oplus b_{16} k_{16}(t-1) + bk(t-1)$ $\oplus cp(t-1) \oplus dq(t-1) \oplus er(t) \oplus L = 0,$ and in case a constant multiplier takes on the binary value 0, this constant multiplier and the corresponding XOR gate, at the one input of which the output thereof is present, are simply omitted, and the line present at the other input of this XOR gate is simply drawn through, and, if a constant multiplier takes on the value 1, the line present at its input is directly drawn through onto the input of the XOR gate to which the output of this constant multiplier is connected.

31. The apparatus for recognizing a failure in a cryptographic unit of claim 30, wherein the evaluator is formed to perform an XOR operation of the output signals $r_1 \oplus r_2$.

* * * * *